US012318937B2

(12) United States Patent
Wang et al.

(10) Patent No.: US 12,318,937 B2
(45) Date of Patent: Jun. 3, 2025

(54) ERROR DETECTION METHOD AND ROBOT SYSTEM BASED ON ASSOCIATION IDENTIFICATION

(71) Applicants: The First Affiliated Hospital of Naval Medical University, Shanghai (CN); BEIJING SURGERII ROBOTICS COMPANY LIMITED, Beijing (CN)

(72) Inventors: Linhui Wang, Shanghai (CN); Bo Yang, Shanghai (CN); Chao Zhang, Shanghai (CN); Zongqin Zhang, Shanghai (CN); Tie Zhou, Shanghai (CN); Hong Xu, Shanghai (CN); Chengwu Xiao, Shanghai (CN); Xiaofeng Wu, Shanghai (CN); Kai Xu, Beijing (CN)

(73) Assignees: THE FIRST AFFILIATED HOSPITAL OF NAVAL MEDICAL UNIVERSITY, Shanghai (CN); BEIJING SURGERII ROBOTICS COMPANY LIMITED, Beijing (CN)

( * ) Notice: Subject to any disclaimer, the term of this patent is extended or adjusted under 35 U.S.C. 154(b) by 244 days.

(21) Appl. No.: 18/091,857

(22) Filed: Dec. 30, 2022

(65) Prior Publication Data
US 2023/0219220 A1 Jul. 13, 2023

(30) Foreign Application Priority Data

Jan. 7, 2022 (CN) .................. 202210014974.X

(51) Int. Cl.
*B25J 9/16* (2006.01)
(52) U.S. Cl.
CPC ........... *B25J 9/1653* (2013.01); *B25J 9/1674* (2013.01); *B25J 9/1697* (2013.01)

(58) Field of Classification Search
CPC ...... B25J 9/1653; B25J 9/1674; B25J 9/1697; B25J 9/1692; B25J 13/006; G05B 2219/39017; Y02P 90/02
See application file for complete search history.

(56) References Cited

U.S. PATENT DOCUMENTS

| 10,373,336 B1 * | 8/2019 | Islam ................. B25J 9/1697 |
| 11,370,121 B2 * | 6/2022 | Islam ................. B25J 9/1692 |

(Continued)

FOREIGN PATENT DOCUMENTS

| CN | 106408609 A | 2/2017 |
| CN | 108297095 A | 7/2018 |

(Continued)

OTHER PUBLICATIONS

Closed-Loop Pose Control and Automated Suturing of Continuum Surgical Manipulators With Customized Wrist Markers Under Stereo Vision (Year: 2021).*

(Continued)

*Primary Examiner* — Truc M Do
*Assistant Examiner* — Tyler Roger Robarge
(74) *Attorney, Agent, or Firm* — Bayes PLLC

(57) ABSTRACT

The present application relates to the field of error detection technology. An error detection method and a robot system are provided. The error detection method includes: obtaining a target pose of an end of an operating arm; acquiring a positioning image; recognizing, in the positioning image, a plurality of pose identifications located on the end of the operating arm; recognizing, based on the plurality of pose identifications, an angle identification located on the end of the operating arm, the angle identification having a position association relationship with a first pose identification of the plurality of pose identifications; determining, based on the angle identification and the plurality of pose identifications, (Continued)

an actual pose of the end of the operating arm; and generating, in response to the target pose and the actual pose meeting an error detection condition, a control signal related to a fault.

16 Claims, 10 Drawing Sheets

(56) References Cited

U.S. PATENT DOCUMENTS

| | | | | |
|---|---|---|---|---|
| 11,584,013 | B2* | 2/2023 | Vepakomma | B25J 9/1692 |
| 2016/0214255 | A1* | 7/2016 | Uhlenbrock | B25J 9/1674 |
| 2018/0236669 | A1* | 8/2018 | Fukuda | H04N 19/139 |
| 2021/0122050 | A1 | 4/2021 | Islam et al. | |
| 2023/0293252 | A1* | 9/2023 | Xu | A61B 34/37 |
| | | | | 700/245 |

FOREIGN PATENT DOCUMENTS

| | | | | |
|---|---|---|---|---|
| CN | 108399639 | A | | 8/2018 |
| CN | 108555908 | A | | 9/2018 |
| CN | 112489133 | A | | 3/2021 |
| CN | 112589787 | A | | 4/2021 |
| CN | 112836558 | A | | 5/2021 |
| CN | 113409384 | A | * | 9/2021 |
| CN | 113712665 | A | * | 11/2021 |
| CN | 113876436 | A | * | 1/2022 | A61B 34/20 |
| CN | 115708128 | A | * | 2/2023 |
| CN | 115731289 | A | * | 3/2023 |
| CN | 115946105 | A | * | 4/2023 |
| WO | WO-2019114339 | A1 | * | 6/2019 | B25J 9/1692 |
| WO | WO-2022175810 | A1 | * | 8/2022 | A61B 34/20 |

OTHER PUBLICATIONS

B. Wu, L. Wang, X. Liu, L. Wang and K. Xu, "Closed-Loop Pose Control and Automated Suturing of Continuum Surgical Manipulators With Customized Wrist Markers Under Stereo Vision," in IEEE Robotics and Automation Letters, vol. 6, No. 4, pp. 7137-7144, Oct. 2021 (Year: 2021).*

Search Report in related Chinese Application No. 202210014974.X dated Sep. 29, 2022 (4 pages).

European Search Report in related European Application No. EP23150366 dated May 2, 2023 (3 pages).

Baibo Wu et al, Closed-Loop Pose Control and Automated Suturing of Continuum Surgical Manipulators With Customized Wrist Markers Under Stereo Vision, IEEE Robotics and Automation Letters, vol. 6, No. 4, pp. 7137-7144 (Oct. 2021) (8 pages).

* cited by examiner

1500

1600

ERROR DETECTION METHOD AND ROBOT SYSTEM BASED ON ASSOCIATION IDENTIFICATION

CROSS-REFERENCE TO RELATED APPLICATION

The present application claims the benefits of priority to Chinese Application No. 202210014974.X, filed Jan. 7, 2022, the entire contents of which are expressly incorporated herein by reference.

TECHNICAL FIELD

The present disclosure relates to the field of error detection technology, and in particular to an error detection method and a robot system based on association identification.

BACKGROUND

Generally, a robot system for remote operations comprises an operating arm for performing operations and a master manipulator for controlling a motion of the operating arm. In an actual scene, the operating arm is disposed to be capable of entering into an operating area, and an operator may control the motion of the operating arm in the operation area by remotely operating the master manipulator, thus an operation is performed by an effector disposed at an end of the operating arm. This robot achieves a motion control of the master manipulator to the operating arm by a motion conversion between the master manipulator and the operating arm.

The robot has a high requirement for operation accuracy and human-computer interaction experience. During a remote operation process, it is necessary to detect a pose error of the operating arm in real time, to determine whether the operating arm has correctly moved to a position and an orientation corresponding to the operation of the master manipulator according to the operator's expectations, and then to govern the working status of the robot system in real time.

SUMMARY

In some embodiments, the present disclosure provides an error detection method. The method may include: obtaining a target pose of an end of an operating arm; acquiring a positioning image; recognizing, in the positioning image, a plurality of pose identifications located on the end of the operating arm; recognizing, based on the plurality of pose identifications, an angle identification located on the end of the operating arm, the angle identification having a position association relationship with a first pose identification of the plurality of pose identifications; determining, based on the angle identification and the plurality of pose identifications, an actual pose of the end of the operating arm; and generating, in response to the target pose and the actual pose meeting an error detection condition, a control signal related to a fault.

In some embodiments, the present disclosure provides a computer device comprising: a memory for storing at least one instruction; and a processor coupled with the memory and for executing the at least one instruction to perform the method of any of some embodiments of the present disclosure.

In some embodiments, the present disclosure provides a computer-readable storage medium for storing at least one instruction that when executed by a computer, causes the computer to perform the method of any of some embodiments of the present disclosure.

In some embodiments, the present disclosure provides a robot system comprising: a master manipulator including a robotic arm, a handle disposed on the robotic arm, and at least one master manipulator sensor disposed at at least one joint on the robotic arm, the at least one master manipulator sensor being used to obtain joint information of the at least one joint; an operating arm, an end of the operation arm being provided with at least one angle identification and a plurality of pose identifications; at least one drive device for driving the operating arm; at least one drive device sensor coupled with the at least one drive device and for obtaining status information of the at least one drive device; an image acquisition device for acquiring a positioning image of the operating arm; and a control device configured to be connected with the master manipulator, the at least one drive device, the at least one drive device sensor and the image acquisition device, and to perform the method of any of some embodiments of the present disclosure.

DETAILED DESCRIPTION

Figure 1:
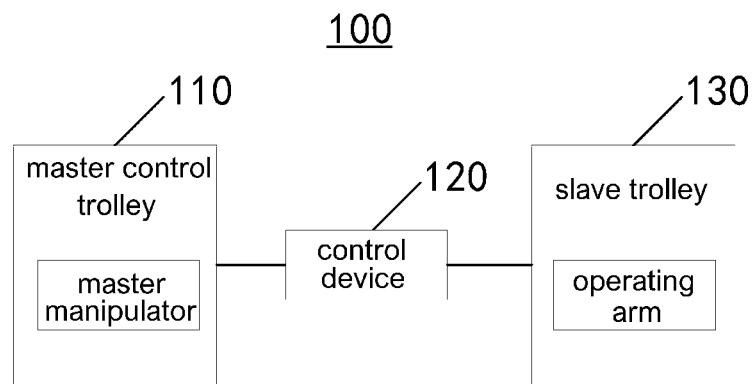
FIG. 1 shows a structure diagram of a robot system according to some embodiments of the present disclosure.

To make the solved technical problems, the used technical solutions, and the achieved technical effects of the present disclosure more clearly, the technical solutions of the embodiments of the present disclosure will be further illustrated in detail below with reference to the accompanying drawings. Those skilled in the art could understand that the described embodiments should be considered to be exemplary rather than limiting in all aspects, and should be only exemplary embodiments, but not all embodiments, of the present disclosure.

In the description of the present disclosure, it should be noted that, orientational or positional relationships indicated by the terms "center", "upper", "lower", "left", "right", "vertical", "horizontal", "inner", "outer" and the like are the orientational or positional relationships shown based on the accompanying drawings, and are only for ease of describing the present disclosure and simplifying the description, rather than indicating or implying that the apparatus or element referred to must have a specific orientation or be constructed and operated in a specific orientation, and therefore cannot be construed as limiting the present disclosure. In addition, the terms "first" and "second" are used for descriptive purposes only, and cannot be understood as indicating or implying relative importance.

In the description disclosed by the present invention, it should be noted that, unless otherwise specified and defined, the term "mount", "connected", and "connect", or "couple" should be comprehended in a broad sense. For example, the term may be a fixed connection or a detachable connection; may be a mechanical connection or an electrical connection; may be a direct connection or an indirect connection via an intermediate medium; or may be internal communication between two elements. For those of ordinary skill in the art, specific meanings of the foregoing terms in the disclosure of the present invention may be understood based on specific situations. In the disclosure of the present invention, an end close to an operator is defined as a proximal end, a proximal portion, a rear end, or a rear portion, and an end close to an object to be manipulated is defined as a distal end, a distal portion, a front end, or a front portion. Those skilled in the art could understand that embodiments of the present disclosure may be applied to an operating arm disposed on a mechanical device operating in a variety of environments comprising but not limited to, on the surface of the earth, underground, underwater, in space and within living organisms.

In the present disclosure, the term "position" refers to a positioning of an object or a portion of the object in three-dimensional space (e.g., variations in Cartesian X, Y, and Z coordinates may be used to describe three translational degrees of freedom, e.g., three translational degrees of freedom along the Cartesian X-axis, Y-axis, and Z-axis respectively). In the present disclosure, the term "orientation" refers to a rotation setting of an object or a portion of the object (e.g., three rotational degrees of freedom, which may be described using roll, pitch, and deflection). In the present disclosure, the term "pose" refers to a combination of a position and an orientation of an object or a portion of the object. For example, it may be described using six parameters in the six degrees of freedom mentioned above. In the present disclosure, a pose of a handle of a master manipulator may be represented by a collection of joint information of joints of the master manipulator (e.g., a one-dimensional matrix composed of these joint information). The pose of the operating arm may be determined by drive information of the operating arm. In the present disclosure, the joint information of the joint may include an angle of a respective joint rotating relative to a corresponding joint axis or a distance of the respective joint moving relative to an initial position.

In the present disclosure, a reference coordinate system may be understood as a coordinate system capable of describing a pose of an object. According to actual positioning requirements, the reference coordinate system may be chosen to take an origin of a virtual reference object or an origin of a real reference object as an origin of the coordinate system. In some embodiments, the reference coordinate system may be a world coordinate system, or a coordinate system of the space where the master manipulator, the operating arm, or a camera is located, or the operator's own perception coordinate system and the like.

In the present disclosure, the object may be understood as a subject or a target needed to be positioned, such as the operating arm or the end of the operating arm. A pose of the operating arm or a portion (for example, an end) thereof may refer to a pose of the coordinate system defined by the operating arm or the portion thereof relative to the reference coordinate system.

FIG. 1 shows a structure diagram of a robot system 100 according to some embodiments of the present disclosure. In some embodiments, as shown in FIG. 1, the robot system 100 may include a master control trolley 110, a slave trolley 130 and a control device 120. The control device 120 may be communicatively connected with the master control trolley 110 and the slave trolley 130, for example, via cable connections, or via wireless connections, to achieve the communication with the master control trolley 110 and the slave trolley 130. The master control trolley 110 includes a master manipulator for an operator to operate remotely, and the slave trolley 130 includes at least one operating arm for performing an operation. With the control device 120 to achieve a master-slave mapping between the master manipulator in the master control trolley 110 and the operating arm in the slave trolley 130, a motion control of the operating arm by the master manipulator is achieved. In some embodiments, the operating arm is disposed to be capable of entering into an operating area through a tube sleeve, sheath sleeve, etc., The tube sleeve and the sheath sleeve may be fixed at an opening (such as an artificial opening or a natural opening) formed on a wall surface, animal body, etc., The operating area may be an area for operation. The operating arm may be a continuum deformable arm, and a distal end of the operating arm may be provided with an end instrument (e.g., an effector) comprising, but not limited to, excavation instrument, underwater operating instrument, sorting instrument, surgical instrument, etc., Those skilled in the art will appreciate that the master control trolley 110 and the slave trolley 130 may employ other structures or forms, such as a base, a bracket or a building and the like.

In some embodiments, in addition to an operating tool, the operating arm may also be used as a vision tool. The end instrument of the vision tool may include, but is not limited to, an image acquisition device or a lighting device and the like. In some embodiments, the master control trolley may include the master manipulator and a display for displaying an image of the operating area. The image acquisition device may be used to acquire images of the operating area and transmit the acquired images to the slave trolley. The image is displayed on a display of the slave trolley after being processed by a video processing module in the slave trolley. The operator obtains poses of the end of the operating arm relative to the reference coordinate system in real time from the images in the display. The pose of the master manipulator relative to the reference coordinate system is an orientation that the operator actually perceives. A pose change felt by the operator in remotely operating the master manipulator and an orientation change of the end of the operating arm perceived by the operator in the display conform to a preset pose relationship. In this way, by remotely operating the master manipulator, a pose change of the master manipulator is converted into a pose change of the end of the operating arm based on the preset pose relationship, and then a pose control of the end of the operating arm is achieved. In this way, when the operator holds a handle of the master manipulator to move so as to operate the operating arm, based on a principle of an intuitive operation, an amount of orientation change of the end instrument of the operating arm felt by the operator is kept to be consistent with an amount of orientation change of the master manipulator felt by the operator, which facilitates to improve remote operation feeling and remote operation accuracy of the operator.

During the remote operation process, sometimes the operating arm cannot move accurately to a position and an orientation corresponding to the operation of the master manipulator as expected by the operator. In the present disclosure, a pose error of the operating arm is detected in the process of the remote operation, and it is determined whether the operating arm is correctly moved according to the operator's expectation, such that the working status of the robot system is governed in real time. Those skilled in the art may understand that a pose error detection method according to some embodiments of the present disclosure may also be performed in a non-remote operation process.

Figure 2:
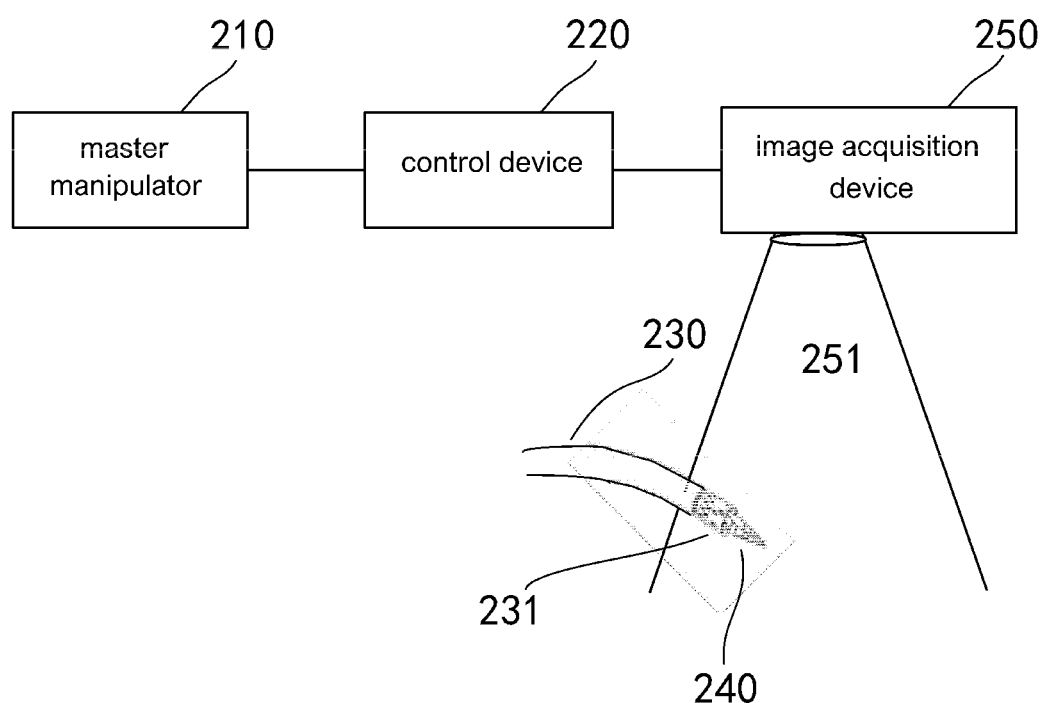
FIG. 2 shows a schematic diagram of an error detection system according to some embodiments of the present disclosure.

FIG. 2 shows a schematic diagram of an error detection system 200 according to some embodiments of the present disclosure. As shown in FIG. 2, the system 200 may include a master manipulator 210, a control device 220, an operating arm 230, and an image acquisition device 250. The operating arm 230 may be implemented by a deformable arm or a rigid arm. In some embodiments, the operating arm 230 may include an operating arm end 231 at the end or distal end, and the operating arm end 231 may be provided with an end instrument 240.

The control device 220 may be communicatively connected with at least one drive device, send drive information to the drive device, and control a motion of the operating arm 230 to enable the operating arm end 231 to move to a desired position and orientation. For example, the at least one drive device controlling the motion of the operating arm 230 may be a servo motor, and may accept an instruction of the control device to control the motion of the operating arm 230. In some embodiments, the control device 220 may determine a target pose of the operation arm end 231 based on the pose of the master manipulator 210 and the mapping relationship between the master manipulator 210 and the operating arm 230.

The image acquisition device 250 is communicatively connected with the control device 220. In some embodiments, the image acquisition device 250 may be used to acquire a positioning image, and the image acquisition device 250 may include, but is not limited to, a dual-lens image acquisition device or a single-lens image acquisition device, such as a binocular or monocular camera. The positioning image may include an image of a part or whole of the operating arm 230 located in the operating area. In some embodiments, the image acquisition device 250 may be used to acquire an image of the operating arm end 231, and the operating arm end 231 may be provided with positioning identification. The positioning identification may include a pose identification and an angle identification (as described in detail below).

As shown in FIG. 2, the operating arm end 231 is within the field of view 251 of the image acquisition device 250, thus the acquired positioning image may include an image of the operating arm end 231. According to different application scenes, the image acquisition device 250 may be an industrial camera, an underwater camera, a micro electronic camera, an endoscopic camera, etc., In some embodiments, the image acquisition device 250 may be fixed in position or changeable in position, for example, an industrial camera which is fixed in a monitoring position or an endoscopic camera with adjustable orientation. In some embodiments, the image acquisition device 250 may achieve at least one of visible band imaging, infrared band imaging, CT (Computed Tomography, electronic computed tomography) imaging and acoustic imaging. According to the different types of images acquired, those skilled in the art may choose different image acquisition devices as the image acquisition device 250.

In some embodiments, the control device 220 may receive a positioning image from the image acquisition device 250, and process the positioning image. For example, the control device 220 may recognize, in the positioning image, a plurality of pose identifications and at least one angle identification located on the operating arm end 231, and determine the pose of the operating arm end 231 relative to a reference coordinate system (e.g., a world coordinate system), as an actual pose of the operating arm end 231.

Figure 18:
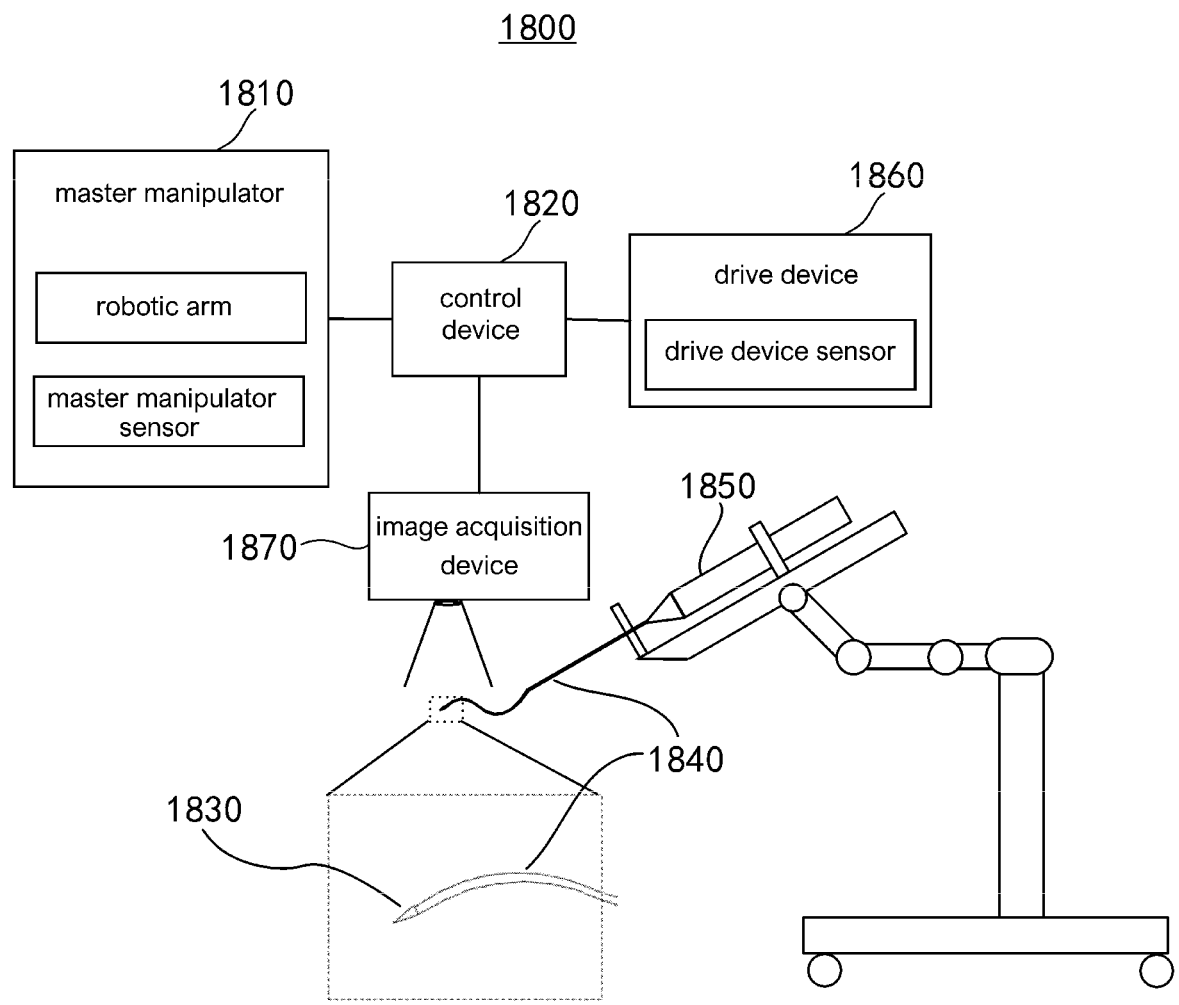
FIG. 18 shows a schematic diagram of a robot system according to some embodiments of the present disclosure.

In the present disclosure, the control device 220 may perform an error detection on the operating arm 230 based on the target pose and the actual pose of the operating arm end 231, determine whether the operating arm end 231 accurately moved to a position and an orientation corresponding to the operation of the master manipulator 210, and then determine whether the operating arm 230 has failed and generate a corresponding control signal. In some embodiments, the control device 220 may also determine the target pose and the actual pose of the operating arm end 231 at a predetermined period, to perform the error detections on the operating arm 230 in real time by a plurality of detection cycles. Those skilled in the art should understand that the system 200 may be applied to a dedicated or general-purpose robot system in a plurality of fields (e.g., medical, industrial manufacturing, etc.), such as a robot system 100 as shown in FIG. 1, or a robot system 1800 as shown in FIG. 18. As an example, the system 200 may be applied to a robot system such as a surgical robot, etc., and the end instrument 240 disposed at a distal end of the operating arm end 231 may be, for example, a surgical effector.

Figure 3:
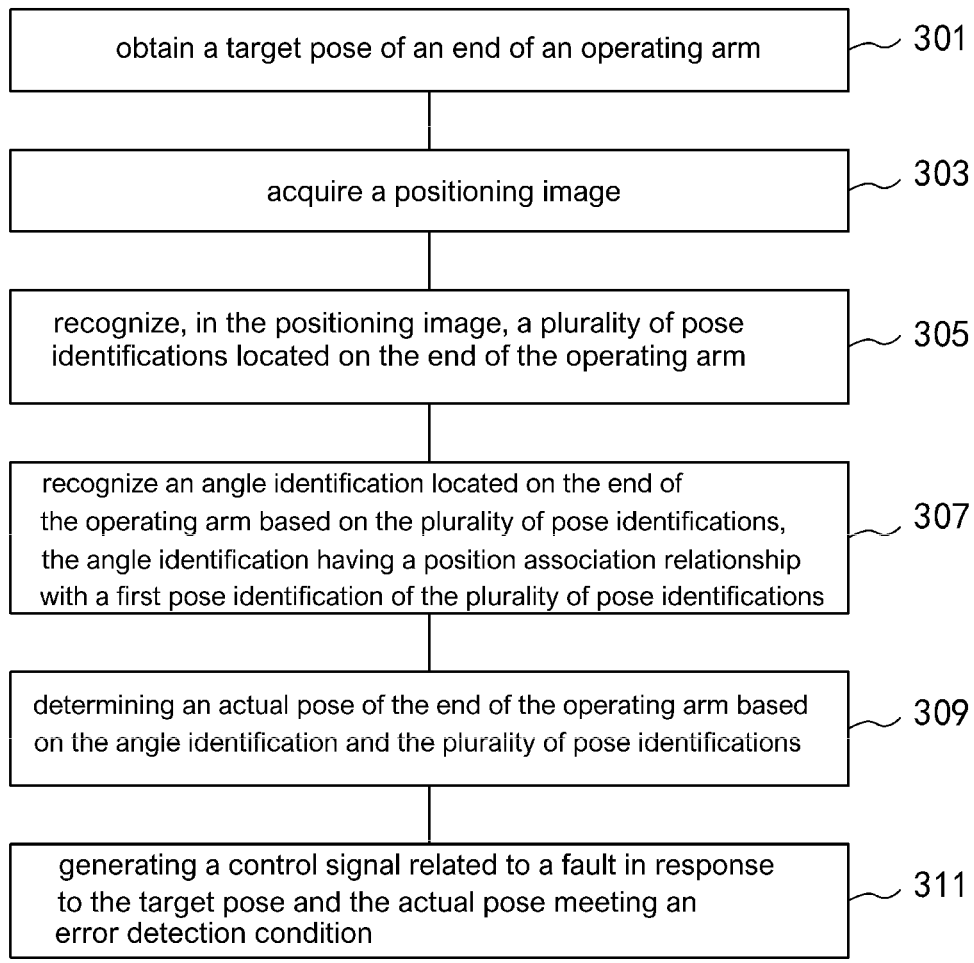
FIG. 3 shows a flowchart of an error detection method according to some embodiments of the present disclosure.

Some embodiments of the present disclosure provide an error detection method for the operating arm of a robot system. FIG. 3 shows a flowchart of an error detection method 300 (hereinafter referred to as "method 300") according to some embodiments of the present disclosure. The method 300 may be implemented or performed by hardware, software or firmware. In some embodiments, the method 300 may be performed by a robot system (e.g., a robot system 100 as shown in FIG. 1, or a robot system 1800 as shown in FIG. 18). In some embodiments, the method 300 may be implemented as computer-readable instructions. These instructions may be read and performed by a general-purpose processor or a dedicated processor (e.g., a control device 120 as shown in FIG. 1, a control device 220 as shown in FIG. 2, or a control device 1820 as shown in FIG. 18). For example, the control device for the robot system may include a processor configured to perform the method 300. In some embodiments, these instructions may be stored on a computer-readable medium.

Referring to FIG. 3, at step 301, a target pose of an end of an operating arm is obtained. In some embodiments, the target pose of the end of the operating arm may be determined according to a pose of a master manipulator based on a master-slave motion mapping relationship between the pose of the master manipulator and the pose of the end of the operating arm. An exemplary method for obtaining the target pose of the end of the operating arm includes a method as shown in FIG. 4.

Figure 4:
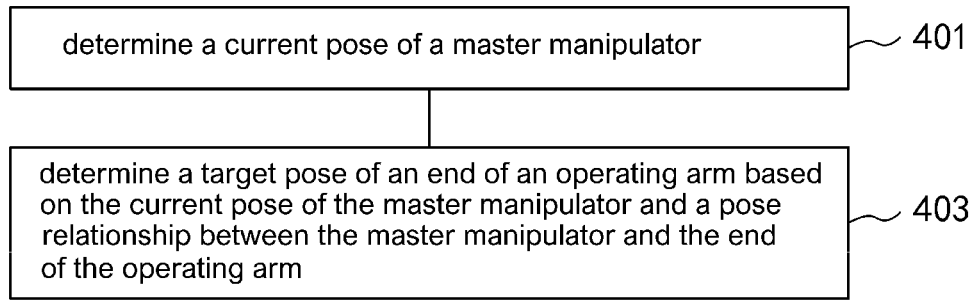
FIG. 4 shows a flowchart of a method for determining a target pose of an end of an operating arm according to some embodiments of the present disclosure.

FIG. 4 shows a flowchart of a method 400 for determining the target pose of the end of the operating arm according to some embodiments of the present disclosure. As shown in FIG. 4, some or all of the steps in the method 400 may be performed by a control device (e.g., a control device 120 as shown in FIG. 1, a control device 220 as shown in FIG. 2 or a control device 1820 as shown in FIG. 18). Some or all of the steps in the method 400 may be implemented by software, firmware, and/or hardware. In some embodiments, the method 400 may be performed by a robot system (e.g., a robot system 100 as shown in FIG. 1, or a robot system 1800 as shown in FIG. 18). In some embodiments, the method 400 may be implemented as computer-readable instructions. These instructions may be read and performed by a general-purpose processor or a dedicated processor (e.g., a control device 1820 shown in FIG. 18). In some embodiments, these instructions may be stored on a computer-readable medium.

Figure 5:
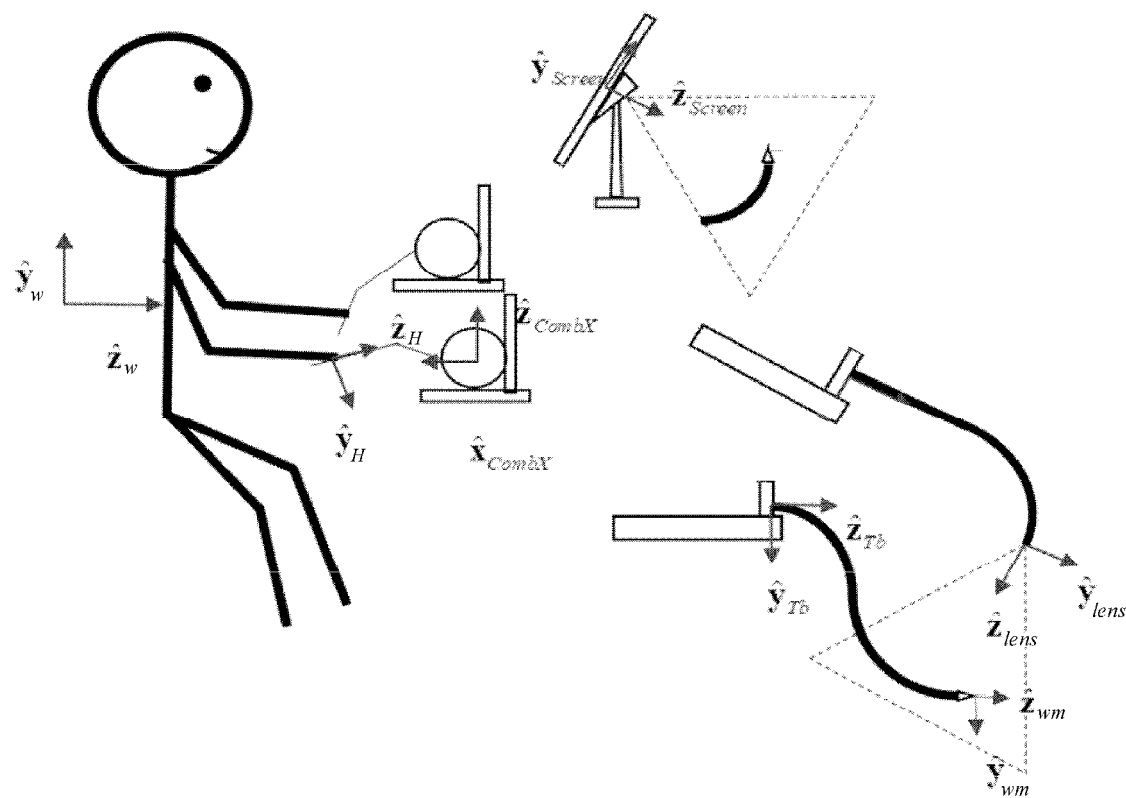
FIG. 5 shows a schematic diagram of coordinate systems in a master-slave motion mapping according to some embodiments of the present disclosure.

FIG. 5 shows a schematic diagram of coordinate systems in a master-slave motion mapping according to some embodiments of the present disclosure. The coordinate systems in FIG. 5 are defined as follows: an operating arm base coordinate system {Tb}, in which an origin is located at a base of the operating arm or an exit of a sheath sleeve, $\hat{z}_{Tb}$ is consistent with an extended line of the base or an axial direction of the sheath sleeve, and a direction of $\hat{y}_{Tb}$ is shown as in FIG. 5. A camera coordinate system {lens}, in which an origin is located at a center of the camera, a camera axis direction is a direction of $\hat{z}_{lens}$, and an upper direction after the field of view is straightened is a direction of $\hat{y}_{lens}$. An end coordinate system {wm} of the operating arm, in which an origin is located at the end of the operating arm, $\hat{z}_{wm}$ is consistent with an axis direction of the end, and a direction of $\hat{y}_{wm}$ is shown in FIG. 5. A reference coordinate system {w}, which may be the coordinate system of the space where the master manipulator or the operating arm or the camera is located, for example the operating arm base coordinate system {Tb}, or the world coordinate system, as shown in FIG. 5. In some embodiments, the operator's somatosensation may be used as a reference. When the operator is sitting upright in front of a main console, a somatosensation upward direction is a direction of $\hat{y}_w$, and a somatosensation forward direction is a direction of $\hat{z}_w$. A display coordinate system {Screen}, in which an origin is at a center of the display, an inward direction perpendicular to a screen picture is a positive direction of $\hat{z}_{Screen}$ and an upward direction of the screen picture is a direction of $\hat{y}_{Screen}$. A master manipulator base coordinate system {CombX}, in which its coordinate axis directions are shown in FIG. 5. A master manipulator's handle coordinate system {H}, in which its coordinate axis directions are shown in FIG. 5.

The coordinate systems as shown in FIG. 5 are taken as an example below, and the method 400 for determining the target pose of the end of the operating arm is described. However, those skilled in the art may understand that other coordinate system definitions may be used to implement the method 400 for determining the target pose of the end of the operating arm.

Referring to FIG. 4, at step 401, a current pose of the master manipulator may be determined. The current pose includes a current position and a current orientation. In some embodiments, the current pose of the master manipulator may be a pose relative to the master manipulator base coordinate system {CombX}. For example, the pose of the master manipulator is a pose of a coordinate system defined by the handle of the master manipulator or a portion thereof relative to the master manipulator base coordinate system {CombX} (for example, a coordinate system defined by a bracket or base on which the master manipulator is located, or the world coordinate system). In some embodiments, determining the current position of the master manipulator comprises determining the current position of the handle of the master manipulator relative to the master manipulator base coordinate system {CombX}, and determining the current orientation of the master manipulator comprises determining the current orientation of the handle of the master manipulator relative to the master manipulator base coordinate system {CombX}.

In some embodiments, the current pose of the master manipulator may be determined based on a coordinate transformation. For example, the current pose of the handle of the master manipulator may be determined based on a transformation relationship between the coordinate system {H} of the handle and the master manipulator base coordinate system {CombX}. In general, the master manipulator base coordinate system {CombX} may be disposed on the bracket or base where the master manipulator is located, and the master manipulator base coordinate system {CombX} remains unchanged during a remote operation.

In some embodiments, the current pose of the master manipulator may be determined based on a master manipulator sensor. In some embodiments, current joint information of at least one joint of the master manipulator is received, and based on the current joint information of the at least one joint, the current pose of the master manipulator is determined. For example, the current pose of the master manipulator is determined based on the current joint information of the at least one joint obtained by the master manipulator sensor. The master manipulator sensor is disposed at at least one joint position of the master manipulator. For example, the master manipulator includes at least one joint, and at least one master manipulator sensor is disposed at the at least one joint. Based on the master manipulator sensor obtaining the joint information (a position or an angle) of a corresponding joint, the current pose of the master manipulator is calculated. For example, the current position and current orientation of the master manipulator are calculated based on a forward kinematics algorithm.

In some embodiments, the master manipulator includes at least one orientation joint for controlling the orientation of the handle. Determining the current orientation of the handle of the master manipulator includes: obtaining the joint information of the at least one orientation joint, and determining the current orientation of the master manipulator based on the joint information of the at least one orientation joint. The master manipulator includes a robotic arm including a position joint and an orientation joint. The orientation joint adjusts an orientation of the master manipulator, and the master manipulator is controlled to reach a target orientation through one or more orientation joints. The position joint adjusts a position of the master manipulator, and the master manipulator is controlled to reach a target position through one or more position joints. The master manipulator sensors are disposed at the orientation joint and the position joint of the robotic arm, for obtaining the joint information (the position or the angle) corresponding to the orientation joint and the position joint. According to the obtained joint information, the current pose of the handle of the master manipulator relative to the master manipulator base coordinate system {CombX} may be determined. For example, the master manipulator may include 7 joints, wherein joints 5, 6 and 7 are orientation joints for adjusting the orientation of the handle of the master manipulator. Based on the joint information (such as the angle) obtained by the master manipulator sensor of the orientation joint and the forward kinematics algorithm, the current orientation of the master manipulator is calculated. Joints 1, 2 and 3 are position joints for adjusting the position of the handle of the master manipulator. Based on the joint information (such as the position) obtained by the master manipulator sensor of the position joint and the forward kinematics algorithm, the current position of the master manipulator is calculated.

At step 403, the target pose of the end of the operating arm may be determined based on the current pose of the master manipulator and the pose relationship between the master manipulator and the end of the operating arm. For example, the master-slave mapping relationship between the master manipulator and the end of the operating arm is established, and the pose of the end of the operating arm is controlled by remotely operating the master manipulator. The pose relationship includes the relationship between the pose of the end of the operating arm relative to the reference coordinate system {w} and the pose of the master manipulator relative to the reference coordinate system {w}. The reference coordinate system {w} includes the coordinate system of the space where the master manipulator or operating arm or the camera is located, or the world coordinate system.

In some embodiments, the pose relationship between the master manipulator and the end of the operating arm may include a relationship between an amount of pose change of the master manipulator and an amount of pose change of the end of the operating arm, such as equal or proportional. Determining the target pose of the end of the operating arm includes: determining a previous pose of the master manipulator, determining a starting pose of the end of the operating arm, and determining a target pose of the end of the operating arm based on the previous pose and the current pose of the master manipulator and the starting pose of the end of the operating arm. The previous pose and the current pose of the master manipulator may be the pose of the handle of the master manipulator relative to the master manipulator base coordinate system {CombX}. The starting pose and target pose of the end of the operating arm may be the pose of the end of the operating arm relative to the operating arm base coordinate system {Tb}.

The pose of the end of the operating arm may include the pose of the end coordinate system {wm} of the operating arm relative to the operating arm base coordinate system {Tb}. The operating arm base coordinate system {Tb} may be the coordinate system of a base to which the operating arm is mounted, the coordinate system of a sheath sleeve through which the end of the operating arm passes (for example, the coordinate system of an exit of the sheath sleeve), the coordinate system of a Remote Center of Motion (RCM) of the operating arm, etc. For example, the operating arm base coordinate system {Tb} may be disposed at the exit position of the sheath sleeve, and the operating arm base coordinate system {Tb} may remain unchanged during the remote operation. A coordinate system transformation may be performed on the starting pose of the end of the operating arm to obtain an orientation relative to other coordinate systems (for example, the reference coordinate system).

In some embodiments, previous joint information of at least one joint of the master manipulator may be received, and based on the previous joint information of the at least one joint, the previous pose of the master manipulator is determined. For example, based on the master manipulator sensor reading the joint information of the master manipulator at a previous time and a current time, the previous pose and the current pose of the handle of the master manipulator are determined. Based on a previous position and a current position of the handle relative to the master manipulator base coordinate system {CombX}, the amount of position change of the handle of the master manipulator is determined. Based on a previous orientation and a current orientation of the handle relative to the master manipulator base coordinate system {CombX}, the amount of orientation change of the handle of the master manipulator is determined.

In some embodiments, an actual pose of the end of the operating arm obtained in a previous round of detection cycle may be received as a starting pose of the end of the operating arm in a current round of detection cycle. For example, in each round of detection cycle, the camera may take a positioning image of the end of the operating arm, and a plurality of pose identifications and at least one angle identification located at the end of the operating arm may be recognized through the positioning image, thereby determining the actual pose of the end of the operating arm (described in more detail below), which may be used as the starting pose of the end of the operating arm in a next round of detection cycle. For example, for a first round of detection cycle, an initial pose of the end of the operating arm (for example, the zero position of the operating arm) may be used as a starting pose for the first round of detection cycle.

In some embodiments, the amount of pose change of the master manipulator may be determined based on the previous pose and the current pose of the master manipulator. The amount of pose change of the end of the operating arm may be determined based on the amount of pose change of the master manipulator and the pose relationship between the master manipulator and the end of the operating arm. The target pose of the end of the operating arm may be determined based on the starting pose of the end of the operating arm and the amount of pose change of the end of the operating arm.

The pose relationship may include a position relationship and an orientation relationship. The position relationship between the master manipulator and the end of the operating arm may include a relationship between an amount of position change of the master manipulator and an amount of position change of the end of the operating arm, such as equal or proportional. The orientation relationship between the master manipulator and the end of the operating arm may include a relationship between an amount of orientation change of the master manipulator and an amount of orientation change of the end of the operating arm, such as equal or proportional.

In some embodiments, the method 400 further comprises: determining the current position of the handle of the master manipulator relative to the master manipulator base coordinate system, determining the previous position of the handle relative to the master manipulator base coordinate system, determining the starting position of the end of the operating arm relative to the operating arm base coordinate system, and determining the target position of the end of the operating arm relative to the operating arm base coordinate system based on the previous position and the current position of the handle relative to the master manipulator base coordinate system, the transformation relationship between the operating arm base coordinate system and the master manipulator base coordinate system, and the starting position of the end of the operating arm relative to the operating arm base coordinate system. For example, the previous position of the master manipulator is determined based on the joint information read by the master manipulator sensor and corresponding to the master manipulator at the previous time, and the current position of the master manipulator is determined based on the joint information read by the master manipulator sensor and corresponding to the master manipulator at the current time. The amount of position change of the master manipulator is determined based on the previous position and the current position of the handle relative to the master manipulator base coordinate system {CombX}. The starting position of the end of the operating arm is determined based on the actual pose of the end of the operating arm obtained in the previous round of detection cycle. The amount of position change of the end of the operating arm is determined based on the amount of position change of the master manipulator and the pose relationship between the master manipulator and the end of the operating arm. The target position of the end of the operating arm is determined based on the starting position of the end of the operating arm and the amount of position change of the end of the operating arm.

In some embodiments, the method 400 further comprises: determining the current orientation of the handle of the master manipulator relative to the master manipulator base coordinate system, determining the previous orientation of the handle relative to the master manipulator base coordinate system, determining the starting orientation of the end of the operating arm relative to the operating arm base coordinate system, and determining the target orientation of the end of the operating arm relative to the operating arm base coordinate system based on the previous orientation and the current orientation of the handle relative to the master manipulator base coordinate system, the transformation relationship between the operating arm base coordinate system and the master manipulator base coordinate system, and the starting orientation of the end of the operating arm relative to the operating arm base coordinate system. For example, the previous orientation of the master manipulator is determined based on the joint information read by the master manipulator sensor and corresponding to the master manipulator at the previous time, and the current orientation of the master manipulator is determined based on the joint information read by the master manipulator sensor and corresponding to the master manipulator at the current time. The amount of orientation change of the master manipulator is determined based on the previous orientation and the current orientation of the handle relative to the master manipulator base coordinate system {CombX}. The starting orientation of the end of the operating arm is determined based on the actual pose of the end of the operating arm obtained in the previous round of detection cycle. The amount of orientation change of the end of the operating arm is determined based on the amount of orientation change of the master manipulator and the pose relationship between the master manipulator and the end of the operating arm. The target orientation of the end of the operating arm is determined based on the starting orientation of the end of the operating arm and the amount of orientation change of the end of the operating arm.

In some embodiments, the pose relationship comprises: the amount of position change of the end of the operating arm in the reference coordinate system {w} being proportional to the amount of position change of the master manipulator in the reference coordinate system {w}, which may be expressed as:

$$^{w}\Delta P_{wm} = k \cdot {}^{w}\Delta P_{H} \tag{1}$$

In the equation (1), $^{w}\Delta P_{wm}$ on the left side represents the amount of position change of the end of the operating arm relative to the reference coordinate system {w}, and $^{w}\Delta P_{H}$ on the right side represents the amount of position change of the master manipulator relative to the reference coordinate system {w}. And, $^{w}\Delta P_{wm}$ is in a proportional relationship with $^{w}\Delta P_{H}$, and the scale factor is k.

In some embodiments, the amount of position change of the master manipulator $^{w}\Delta P_{H}$ may be determined based on the previous position $^{w}P_{H(t0)}$ and the current position $^{w}\Delta P_{H}$ of the master manipulator relative to the reference coordinate system {w}. For example, at the time t0 in a remote operation, the previous position $^{w}P_{H(t0)}$ of the handle of the master manipulator relative to the reference coordinate system {w} may be determined based on the joint information of the master manipulator obtained by the master manipulator sensor. At the time t1 in the remote operation, the current position $^{w}P_{H}$ of the handle of the master manipulator relative to the reference coordinate system {w} may be determined based on the joint information of the master manipulator obtained by the master manipulator sensor. The amount of position change of the master manipulator $^{w}\Delta P_{H}$ is obtained based on the previous position $^{w}P_{H(t0)}$ of the master manipulator at the time to and the current position $^{w}P_{H}$ of the master manipulator at the time t1. In some embodiments, a plurality of control cycles for the operating arm may be included between the time to and the time t1. The time to may be the time when the remote operation instruction is triggered or the time when the plurality of control cycles start, and the time t1 may be the time when the remote operation instruction ends or the time when the plurality of control cycles are completed.

In some embodiments, the amount of position change $^{w}\Delta P_{wm}$ of the end of the operating arm may be determined based on the starting position $^{w}P_{wmS}$ and the target position $^{w}P_{wMT}$ of the end of the operating arm relative to the reference coordinate system {w}. In some embodiments, a detection cycle (e.g., t0 to t1) of the operating arm may cover a plurality of control cycles for the operating arm. For example, the previous round of detection cycle for the operating arm may end at time to, and the current round of detection cycle for the operating arm may start at time to and end at time t1. In some embodiments, the actual position $^w P_{wmR(t0)}$ in the actual pose of the end of the operating arm obtained in the previous round of detection cycle (e.g., at time t0) may be determined as the starting position $^w P_{wmS}$ of the end of the operating arm relative to reference coordinate system {w} in the current detection cycle. The target position $^w P_{wmT}$ of the end of the operating arm relative to the reference coordinate system {w} may be determined based on the amount of position change $_w\Delta P_H$ of the handle and the starting position $^w P_{wmS}$ of the end of the operating arm relative to the reference coordinate system {w}.

In the equation (1), the amount of position change $^w\Delta P_{wm}$ of the end of the operating arm relative to the reference coordinate system {w} may be represented by a difference between the target position $^w P_{wmT}$ of the end of the operating arm relative to the reference coordinate system {w} and the starting position $^w P_{wms}$ of the end of the operating arm (such as, at time t0) relative to the reference coordinate system {w}, as shown in equation (2), $$^w\Delta P_{wm} = {^w P_{wmT}} - {^w P_{wmS}} \qquad (2)$$

In the equation (1), the amount of position change $^w\Delta P_H$ of the master manipulator relative to the reference coordinate system {w} may be represented by a difference between the current position of the master manipulator (e.g., at time t1) relative to the reference coordinate system {w} and the previous position $^w P_{H(t0)}$ of the master manipulator (e.g., in time t0) relative to the reference coordinate system {w}, as shown in equation (3), $$^w\Delta P_H = {^w P_H} - {^w P_{H(0)}} \qquad (3)$$

In some embodiments, by multiplying the left and right sides of equation (1) by the same matrix $^{Tb}R_w$ respectively, an equation (4) is obtained based on the equations (1) to (3), $$^{Tb}R_w(^w P_{wmT} - {^w P_{wmS}}) = k \cdot {^{Tb}R_w}(^w P_H - {^w P_{H(t0)}}) \qquad (4)$$

An equation (5) is obtained based on the left side of the equation (4), $$^{Tb}R_w(^w P_{wmT} - {^w P_{wmS}}) = {^{Tb}P_{wmT}} - {^{Tb}P_{wmS}} \qquad (5)$$

An equation (6) is obtained based on the right side of the equation (4), $$k \cdot {^{Tb}R_w}(^w P_H - {^w P_{H(t0)}}) = k \cdot {^{Tb}R_{CombX}}(^{CombX}P_H - {^{CombX}P_{H(0)}}) \qquad (6)$$

An equation (7) is obtained based on the equations (5) and (6), $$^{Tb}P_{wmT} = k \cdot {^{Tb}R_{CombX}}(^{CombX}P_H - {^{CombX}P_{H(0)}}) + {^{Tb}P_{wmS}} \qquad (7)$$

Based on the equation (7), in some embodiments, the target position $^{Tb}P_{wmT}$ of the end of the operating arm relative to the operating arm base coordinate system {Tb} may be determined based on the previous position $^{CombX}P_{H(10)}$ and the current position $^{CombX}P_H$ of the handle relative to the master manipulator base coordinate system {CombX}, the current position $^{Tb}P_{wmS}$ of the end of the operating arm relative to the operating arm base coordinate system {Tb}, the transformation relationship $^{Tb}R_{CombX}$ between the master manipulator base coordinate system {CombX} and the operating arm base coordinate system {Tb}.

In some embodiments, the orientation of the end of the operating arm in the reference coordinate system {w} is consistent with the orientation of the master manipulator in the reference coordinate system {w}. In some embodiments, the amount of orientation change of the end of the operating arm relative to the reference coordinate system {w} is consistent with the amount of orientation change of the master manipulator relative to the reference coordinate system {w}, which may be expressed as:

$$^w R_{wmS-wmT} = {^w R_{H(t0)-H}} \qquad (8)$$

In the equation (8), $^w R_{wmS-wmT}$ on the left side represents the amount of orientation change of the orientation of the end of the operating arm relative to the reference coordinate system {w}, and $^w R_{H(t0)-H}$ on the right side represents the amount of orientation change of the master manipulator relative to the reference coordinate system {w}.

In some embodiments, the amount of orientation change $^w R_{H(t0)-H}$ of the master manipulator may be determined based on the previous orientation $^w R_{H(t0)}$ and the current orientation $^w R_H$ of the master manipulator relative to the reference coordinate system {w}. For example, at the time t0 in the remote operation, the previous orientation $^w R_{H(t0)}$ of the handle of the master manipulator relative to the reference coordinate system {w} may be determined based on the joint information of the master manipulator obtained by the master manipulator sensor. At the time t1 in the remote operation, the current orientation $^w R_H$ of the handle of the master manipulator relative to the reference coordinate system {w} may be determined based on the joint information of the master manipulator obtained by the master manipulator sensor. The amount of orientation change $^w R_{H(10)-H}$ of the master manipulator may be obtained based on the previous orientation $^w R_{H(t0)}$ of the master manipulator at the time to and the current orientation $^w R_H$ of the master manipulator at the time t1. Similarly, in some embodiments, the time t0 to the time t1 may correspond to a single detection cycle, and may include a plurality of control cycles for the operating arm. The time to may be the time when the remote operation instruction is triggered or the time when the detection cycle starts, and the time t1 may be the time when the remote operation instruction ends or the time when the detection cycle is completed.

In some embodiments, the amount of orientation change $^w R_{wmS-wmT}$ of the end of the operating arm may be determined based on the starting orientation $^w R_{wmS}$ and the target orientation $^w R_{wmT}$ of the end of the operating arm relative to the reference coordinate system {w}. Similarly, in some embodiments, a detection cycle (e.g., t0 to t1) for the operating arm may cover a plurality of control cycles for the operating arm. For example, the previous round of detection cycle for the operating arm may end at time to, and the current round of detection cycle for the operating arm may start at time to and end at time t1. In some embodiments, the actual orientation $^w R_{wmR(t0)}$ in the actual pose of the end of the operating arm obtained in the previous round of detection cycle (e.g., at time t0) may be determined as the starting orientation $^w R_{wmS}$ of the end of the operating arm relative to reference coordinate system {w} in the current detection cycle. The target orientation $^w R_{wmT}$ of the end of the operating arm relative to the reference coordinate system {w} may be determined based on the amount of orientation change $^w R_{H(t0)-H}$ of the handle and the starting orientation $^w R_{wmS}$ of the end of the operating arm relative to the reference coordinate system {w}.

In the equation (8), the amount of orientation change $^w R_{wmS-wmT}$ of the orientation of the end of the operating arm relative to the reference coordinate system {w} may be determined based on the starting orientation $^w P_{wmS}$ of the end of the operating arm relative to the reference coordinate system {w} and the target orientation $^w R_{wmT}$ of the end of the operating arm relative to the reference coordinate system {w}. The amount of orientation change $^w R_{H(t0)-H}$ of the master manipulator relative to the reference coordinate system {w} may be determined based on the previous orientation $^wR_{H(t0)}$ of the handle (such as, at time t0) relative to the reference coordinate system {w} and the current orientation $^wR_H$ of the handle (such as, at time t1) relative to the reference coordinate system {w}. See equation (9) for details, $$^wR_{wmT}(^wR_{wmS})^T = {}^wR_H(^wR_{H(t0)})^T \tag{9}$$

In some embodiments, by multiplying the left and right sides of equation (9) by the same matrix $^{Tb}R_w(^{Tb}R_w)^T$ respectively, an equation (10) is obtained based on the equation (9), $$^{Tb}R_w{}^wR_{wmT}(^wR_{wmS})^T(^{Tb}R^w)^T = {}^{Tb}R_w{}^wR_H(^wR_{H(t0)})^T \\ (^{Tb}R_w)^T \tag{10}$$

An equation (11) is obtained based on the left side of equation (10), $$^{Tb}R_w{}^wR_{wmT}(^wR_{wmS})^T(^{Tb}R_w)^T = (^{Tb}R_w{}^wR_{wmT}) \\ (^{Tb}R_w{}^wR_{wmS})^T = {}^{Tb}R_{wmT}(^{Tb}R_{wmS})^T \tag{11}$$

An equation (12) is obtained based on the right side of the equation (10), $$^{Tb}R_w{}^wR_{H(t0)}(^wR_{H(t0)})^T(^{Tb}R_w)^T = {}^{Tb}R_H(^{Tb}R_{H(t0)})^T = \\ (^{Tb}R_{CombX}{}^{CombX}R_H)(^{Tb}R_{CombX}{}^{CombX}R_{H(t0)})^T \tag{12}$$

Combining with the equations (8) to (12), an expression for the target orientation $^{Tb}R_{wmT}$ of the end of the operating arm during the remote operation may be obtained, as shown in equation (13), $$^{Tb}R_{wmT} = {}^{Tb}R_{CombX}(^{CombX}R_H(^{CombX}R_{H(t0)})^T)^{CombX}R_{Tb}{}^{Tb}R_{wmS} \tag{13}$$

Based on the equation (13), in some embodiments, the target orientation $^{Tb}R_{wmT}$ of the end of the operating arm relative to the operating arm base coordinate system {Tb} may be determined based on the previous orientation $^{CombX}R_{H(t0)}$ and the current orientation $^{CombX}R_H$ of the handle relative to the master manipulator base coordinate system {CombX}, the starting orientation $^wR_{wmS}$ of the end of the operating arm relative to the operating arm base coordinate system {Tb}, and the transformation relationship $^{CombX}R_{Tb}$ between the operating CombX arm base coordinate system {Tb} and the master manipulator base coordinate system {CombX}.

In some embodiments, the transformation relationship $^{CombX}R_{Tb}$ between the operating CombX arm base coordinate system {Tb} and the master manipulator base coordinate system {CombX} may be determined based on the transformation relationship $^{lens}R_{Tb}$ between the operating arm base coordinate system {Tb} and the camera coordinate system {lens}, the transformation relationship Screen R lens between the camera coordinate system {lens} and the display coordinate system {Screen}, and the transformation relationship $^{CombX}R_{Screen}$ between the display coordinate system {Screen} and the master manipulator base coordinate system {CombX}.

In some embodiments, the transformation relationship between the master manipulator and the display may be predetermined. For example, the master manipulator and the display may be fixed on the master control trolley respectively, and the display coordinate system {Screen} and the master manipulator base coordinate system {CombX} have a predetermined transformation relationship. In some embodiments, the operating arm base coordinate system {Tb} and the camera coordinate system {lens} have a predetermined transformation relationship. In some embodiments, the camera may be disposed at the end of a vision tool. Before the operator performs the operation, the vision tool has finished moving, and the transformation relationship $^{lens}R_{Tb}$ between the operating arm base coordinate system {Tb} and the camera coordinate system {lens} will no longer change.

In some embodiments, the display coordinate system {Screen} and the camera coordinate system {lens} are consistent in the definition for the direction of the field of view. Therefore, the amount of position change of an image of the end of the operating arm in the display relative to the display coordinate system {Screen} is consistent with the amount of position change of the end of the operating arm relative to the camera coordinate system {lens}. In this way, when the operator holds the handle of the master manipulator to operate, the pose change of the image of the effector of the end of the operating arm perceived by the operator and the pose change of the handle of the master manipulator perceived by the operator maintain a preset transformation relationship.

In some embodiments, the target pose of the end of the operating arm relative to the reference coordinate system {w} may be determined based on the target pose of the end of the operating arm relative to the operating arm base coordinate system {Tb} and the transformation relationship $^wR_{Tb}$ between the operating arm base coordinate system {Tb} and the reference coordinate system {w}. In some embodiments, the operating arm base coordinate system {Tb} and the reference coordinate system {w} have a predetermined transformation relationship. The detail is shown in the equation (14), $$^wP_{wmT} = {}^wR_{Tb} \cdot {}^{Tb}P_{wmT}$$

$$^wR_{wmT} = {}^wR_{Tb} \cdot {}^{Tb}R_{wmT} \tag{14}$$

Those skilled in the art could understand that the operating arm base coordinate system {Tb} may be used as the reference coordinate system {w}.

In some embodiments, a plurality of pose identifications and at least one angle identification are distributed on the operating arm (e.g., on the operating arm end 231). For example, the plurality of pose identifications are distributed circumferentially on the operating arm end 231, and a plurality of angle identifications are distributed circumferentially on the operating arm end 231. The plurality of pose identifications and the plurality of angle identifications are arranged side-by-side axially on the operating arm end 231. For example, the plurality of pose identifications and the plurality of angle identifications are arranged on an outer surface of a columnar portion of the operating arm end 231.

In some embodiments, each angle identification has a position association relationship with one of the pose identifications. Based on this position association relationship, an area where the angle identification may be distributed may be determined through the position of the pose identification. Alternatively, an area where the pose identification may be distributed may be determined through the position of the angle identification. The position association relationship may be determined based on the specific arrangement of the pose identifications and the angle identifications and may be predesigned.

In some embodiments, the position association relationship may include a correspondence relationship of the angle identifications and the pose identifications in an axial direction. For example, the position association relationship may include an offset along the axial direction. Based on the correspondence relationship in the axial direction, in the case that the positions of one or more pose identifications on the operating arm end are known, the area where the angle identification may exist may be determined with an offset by certain distance along the axial direction. For example, the position association relationship may also include an oblique alignment along the axial direction and the like.

In some embodiments, the plurality of pose identifications and the plurality of angle identifications may be disposed on a label attached to the circumferential side of the operating arm end.

In some embodiments, the pose identification may include a pose identification pattern and a pose identification pattern corner, and the angle identification may include an angle identification pattern and an angle identification pattern corner. In some embodiments, the pose identification pattern and the angle identification pattern may be disposed on a label attached to the operating arm end, or may be printed on the operating arm end, or may be patterns formed by the physical structure of the operating arm end itself, for example, may include a depression or a bump and a combination thereof. In some embodiments, the pose identification pattern or the angle identification pattern may include a pattern formed by brightness, grayscale, color, etc. In some embodiments, the pose identification pattern and the angle identification pattern may include a pattern actively (e.g., self-emitting) or passively (e.g., reflecting lights) providing information to be detected by the image acquisition device. Those skilled in the art may understand that, in some embodiments, a pose of the pose identification may be represented by a pose of a pose identification pattern corner coordinate system, and a pose of the angle identification may be represented by a pose of an angle identification pattern corner coordinate system.

In some embodiments, the pose identification pattern or the angle identification pattern is provided in an area on the operating arm end suitable for the image acquisition device to acquire an image, for example, an area that may be covered by the field of view of the image acquisition device during the operation or an area that is not easily disturbed or obscured during the operation.

Figure 6:
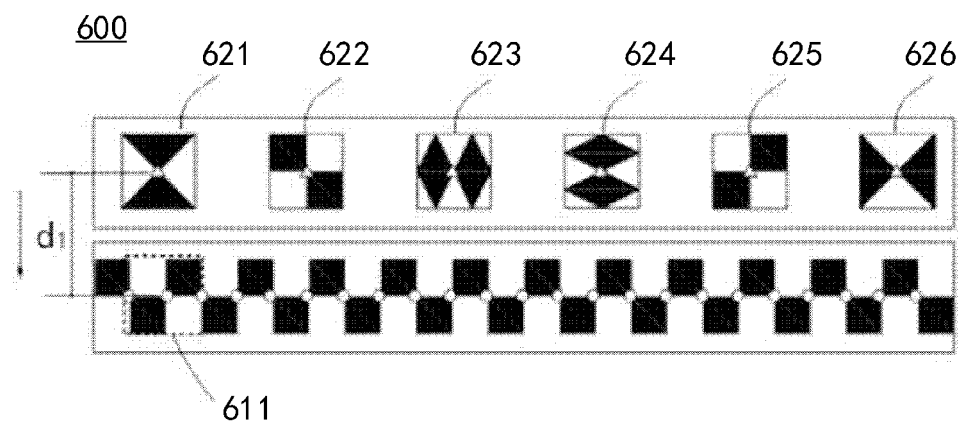
FIG. 6 shows a schematic diagram of a label comprising a plurality of pose identifications and a plurality of angle identifications according to some embodiments of the present disclosure.
Figure 7:
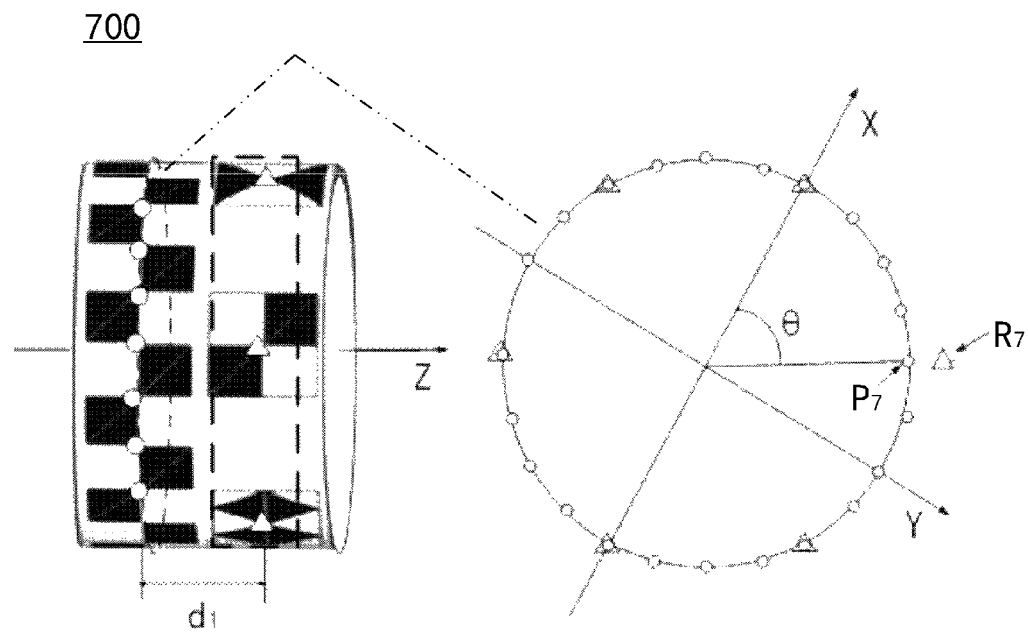
FIG. 7 shows a schematic diagram of a cylindrical label formed by disposing the label around the circumference of the end of the operating arm according to some embodiments of the present disclosure.

FIG. 6 shows a schematic diagram of a label 600 comprising a plurality of pose identifications and a plurality of angle identifications according to some embodiments. FIG. 7 shows a schematic diagram of a label 700 disposed on the circumference of the operating arm end and forming a cylindrical shape. It may be understood that for simplicity, the label 600 may include the same pose identification pattern and angle identification pattern as the label 700.

Referring to FIG. 6, the plurality of pose identifications (in the present disclosure, the pose identification pattern corner is indicated by a symbol "O") and the plurality of angle identifications (in the present disclosure, the angle identification pattern corner is indicated by a symbol "A") are arranged side by side. The plurality of pose identification patterns 611 may be identical or similar, and the plurality of pose identification pattern corners are located in the plurality of pose identification patterns 611. The plurality of angle identification patterns 621-626 may be different, and the plurality of angle identification pattern corners are located in the plurality of angle identification patterns 621-626.

Each angle identification may have a position association relationship with one of the pose identifications. For example, as shown in FIG. 6, in the direction indicated by the arrow, a part (e.g., the pose identification pattern 611) of the pose identifications and the corresponding angle identification (e.g., the angle identification pattern 621) are arranged along the direction of the arrow and have an interval distance d1. Referring to FIG. 7, in a state of being disposed along the circumference, the label 600 becomes the label 700 whose spatial structure is cylindrical, and the position association relationship between each angle identification and one of the pose identifications may include a correspondence relationship between the angle identification and the pose identification in the axial direction (the positive direction of Z-axis as shown in FIG. 7). Based on the correspondence relationship in the axial direction, in the case that the positions of one or more pose identifications on the operating arm end are known, the area where the angle identification may exist may be determined with an offset by certain distance (such as the distance d1) along the axial direction. In some embodiments, the correspondence relationship of the angle identification and the pose identification in the axial direction may be represented by a correspondence relationship between the angle identification pattern corner and the pose identification pattern corner in the axial direction. In some embodiments, based on the correspondence relationship of the angle identification and the pose identification in the axial direction, the angle identification pattern corner coincides with a projection of one of the pose identification pattern corners along the Z-axis direction.

In some embodiments, an around-axis angle or a roll angle of the angle identification or pose identification may be represented by an around-axis angle of the angle identification pattern corner or the pose identification pattern corner. The angle of the angle identification pattern corner relative to the operating arm coordinate system (e.g., an end coordinate system established at the end of the operating arm, the XY coordinate system as shown in FIG. 7) is known or predetermined. For example, the angle between the angle identification pattern corner R7 in FIG. 7 and the X axis in the XY coordinate system is θ. Based on the position association relationship, it can be obtained that the angle of the pose identification pattern corner P7 associated with its position relative to the X axis is the angle of θ. It should be understood that the angle θ corresponding to the angle identification pattern corner R7 and the pose identification pattern corner P7 may be called an around-axis angle or a roll angle of the angle identification or pose identification around the Z axis. In the present disclosure, the around-axis angle or roll angle refers to an angle around the Z axis. It could be understood that for clarity, the angle identification pattern corner R7 and the pose identification pattern corner P7 are shown in FIG. 7 as separated, but they are coincided.

Figure 8:
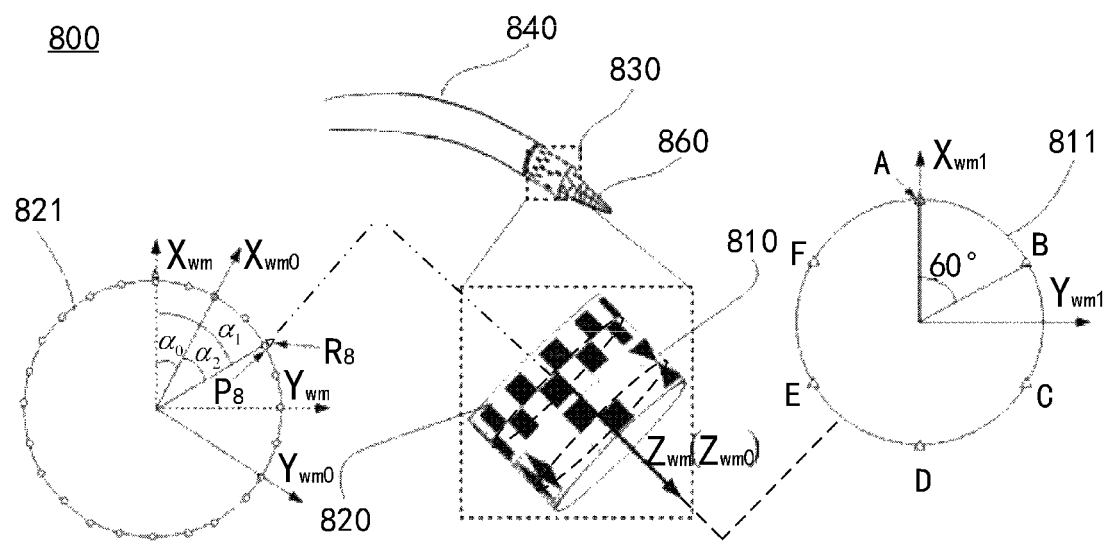
FIG. 8 shows a schematic diagram of an implementation scene according to some embodiments of the present disclosure.

FIG. 8 shows a schematic diagram of an implementation scene 800 according to some embodiments of the present disclosure. As shown in FIG. 8, the operating arm 840 includes an operating arm end 830 and an effector 860 at a distal end, and the plurality of pose identifications and angle identifications may be arranged circumferentially on the operating arm end 830. For example, the label 600 shown in FIG. 6 is disposed circumferentially on the operating arm end 830, forming a cylindrical angle identification pattern band 810 and a pose identification pattern band 820. The plurality of pose identification pattern corners are distributed on a cross-sectional circle 821 of the pose identification pattern band 820 of the operating arm end 830, and the plurality of angle identification pattern corners are distributed on a cross-sectional circle 811 of the angle identification pattern band 810 of the operating arm end 830.

In some embodiments, the plurality of angle identification patterns are different patterns. Each angle identification pattern is used to indicate or identify a different around-axis angle. In some embodiments, the pattern of each angle identification has a one-to-one correspondence relationship with the identified around-axis angle, and the identified around-axis angle may be determined based on the pattern of the angle identification.

For example, as shown in FIG. 8, a plurality of different angle identification patterns (the plurality of angle identification patterns 621-626 as shown in FIG. 6) are evenly distributed along the circumference of the cylindrical structure, forming angle identification pattern corners A-F. By setting the angle identification pattern corresponding to the angle identification pattern corner A as a reference pattern (for example, setting the angle identification pattern corresponding to the angle identification pattern corner A to be used to identify an around-axis angle of) 0°, and establishing a plane coordinate system {wm1}, around-axis angles identified by angle identification pattern corners included in the remaining angle identification patterns may be determined according to the position relationships between the remaining angle identification patterns and the angle identification pattern corresponding to the angle identification pattern corner A. For example, referring to FIG. 8, when the angle identification pattern corresponding to the angle identification pattern corner B is recognized, then according to the position relationship between the angle identification pattern corresponding to the angle identification pattern corner B and the angle identification pattern corresponding to the angle identification pattern corner A, it may be determined that in a two-dimensional plane coordinate system of the cross-sectional circle 811, the around-axis angle identified by the angle identification pattern corner B is 60°. The origin of the two-dimensional plane coordinate system of the cross-sectional circle 811 is the circle center of the cross-sectional circle 811, the X-axis direction is that the origin points towards the angle identification pattern corner A, and the Y axis is perpendicular to the X axis.

In some embodiments, a pose of the effector 860 may be determined by translating the end coordinate system {wm} of the operating arm by a predetermined distance. Alternatively, the pose of the effector 860 may be approximately equal to the pose of the end coordinate system {wm} of the operating arm.

In some embodiments, based on the pose of the end coordinate system of the operating arm relative to the reference coordinate system, the pose of the effector 860 relative to the reference coordinate system {w} is determined. The specific calculation equation is as follows:

$${}^{w}R_{tip} = {}^{w}R_{wm}{}^{wm}R_{tip}$$

$${}^{w}P_{tip} = {}^{w}R_{wm}{}^{wm}P_{tip} + {}^{w}P_{wm} \quad (15)$$

wherein, ${}^{w}R_{tip}$ is an orientation of the effector relative to the reference coordinate system, ${}^{w}P_{tip}$ is a position of the effector relative to the reference coordinate system, ${}^{wm}R_{tip}$ is an orientation of the effector relative to the end coordinate system of the operating arm, ${}^{wm}P_{tip}$ is a position of the effector relative to the end coordinate system of the operating arm, ${}^{w}R_{wm}$ is an orientation of the end coordinate system of the operating arm relative to the reference coordinate system, and ${}^{w}P_{wm}$ is a position of the end coordinate system of the operating arm relative to the reference coordinate system.

Continuing to refer to FIG. 3, at step 303, a positioning image is acquired. In some embodiments, the positioning image comprises a plurality of pose identifications and at least one angle identification on the end of the operating arm. In some embodiments, the positioning image may be received from the image acquisition device 250 shown in FIG. 2. For example, the control device 220 may receive the positioning image sent actively by the image acquisition device 250. Alternatively, the control device 220 may send an image request instruction to the image acquisition device 250, and the image acquisition device 250 sends the positioning image to the control device 220 in response to the image request instruction.

Figure 12:
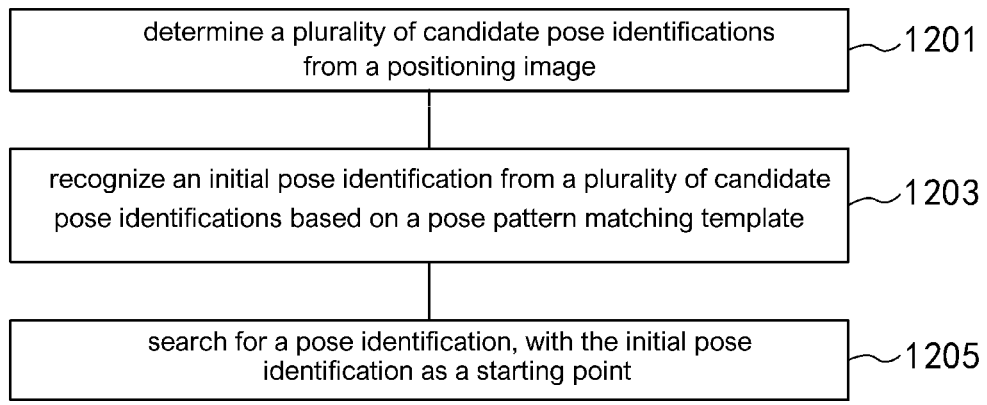
FIG. 12 shows a flowchart of a method for recognizing a pose identification according to some embodiments of the present disclosure.
Figure 14:
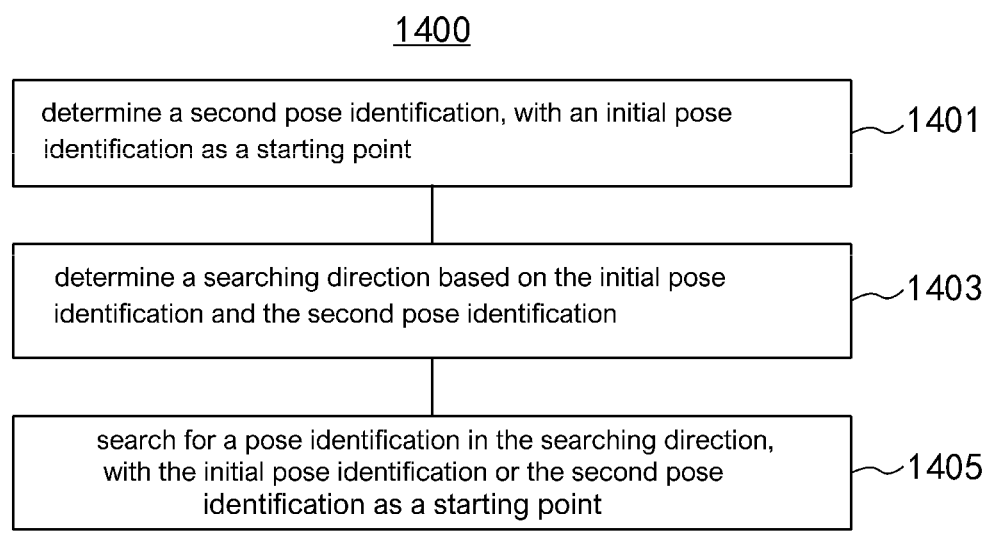
FIG. 14 shows a flowchart of a method for searching for the pose identification according to some embodiments of the present disclosure.

Continuing to refer to FIG. 3, at step 305, the plurality of pose identifications located on the end of the operating arm are recognized in the positioning image. For example, an exemplary method for recognizing the plurality of pose identifications located at the end of the operating arm may include methods as shown in FIGS. 12 and 14. In some embodiments, the control device 220 may recognize some or all of the pose identifications in the positioning image by an image processing algorithm. In some embodiments, the image processing algorithm may include a feature recognition algorithm, and the image processing algorithm may extract or recognize features of the pose identification. For example, the image processing algorithm may include a corner detection algorithm for detecting the pose identification pattern corners. The corner detection algorithm may include, but not limited to, one of grayscale map based corner detection, binary image based corner detection, and contour curve based corner detection. For example, the image processing algorithm may be a color feature extraction algorithm for detecting color features in the pose identification pattern. As another example, the image processing algorithm may include a contour detection algorithm for detecting contour features of the pose identification pattern.

In some embodiments, the control device may recognize some or all of the pose identifications in the positioning image by recognition model.

Figure 16:
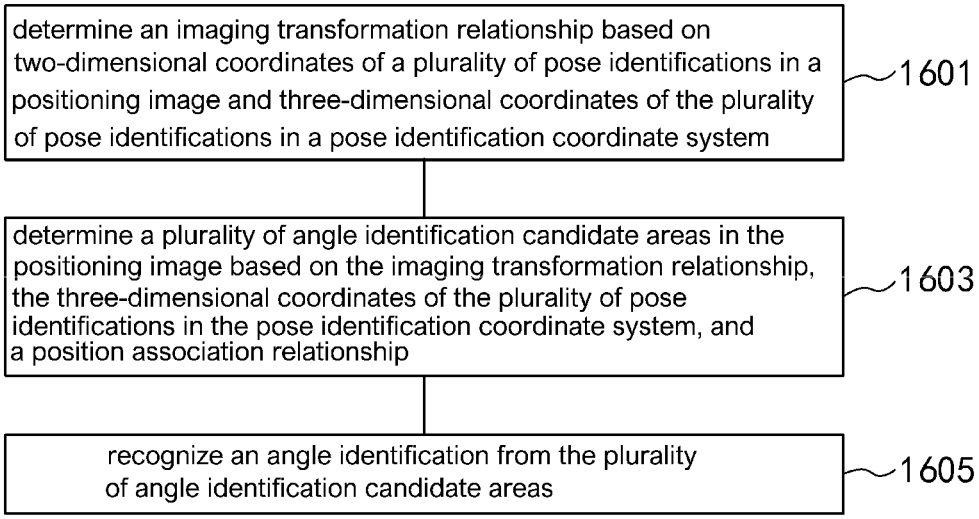
FIG. 16 shows a flowchart of a method for recognizing an angle identification according to some embodiments of the present disclosure.

Continuing to refer to FIG. 3, at step 307, based on the plurality of pose identifications, the angle identification located on the end of the operating arm is recognized. The angle identification has a position association relationship with a first pose identification of the plurality of pose identifications. In some embodiments, after recognizing the plurality of pose identifications, the angle identification located on the end of the operating arm is recognized according to the position association relationship. In some embodiments, the position association relationship between the angle identification and the first pose identification may be a position association relationship as shown in FIG. 6 or FIG. 7. In some embodiments, the first pose identification (e.g., the first pose identification pattern or the first pose identification pattern corner) refers to a pose identification of the plurality of pose identifications that has a position association relationship with the angle identification. Exemplary method for recognizing the angle identification includes the method as shown in FIG. 16.

Figure 9:
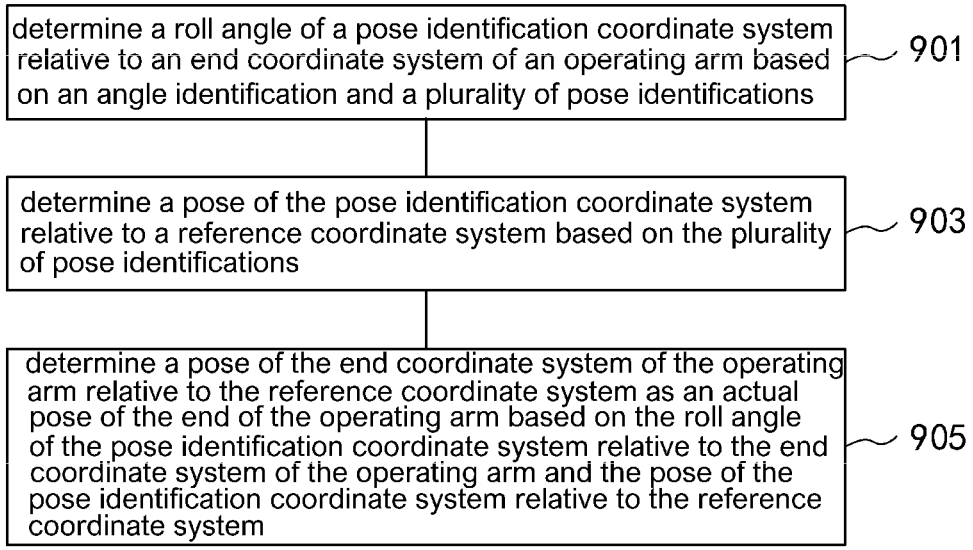
FIG. 9 shows a flowchart of a method for determining an actual pose of the end of the operating arm according to some embodiments of the present disclosure.
Figure 10:
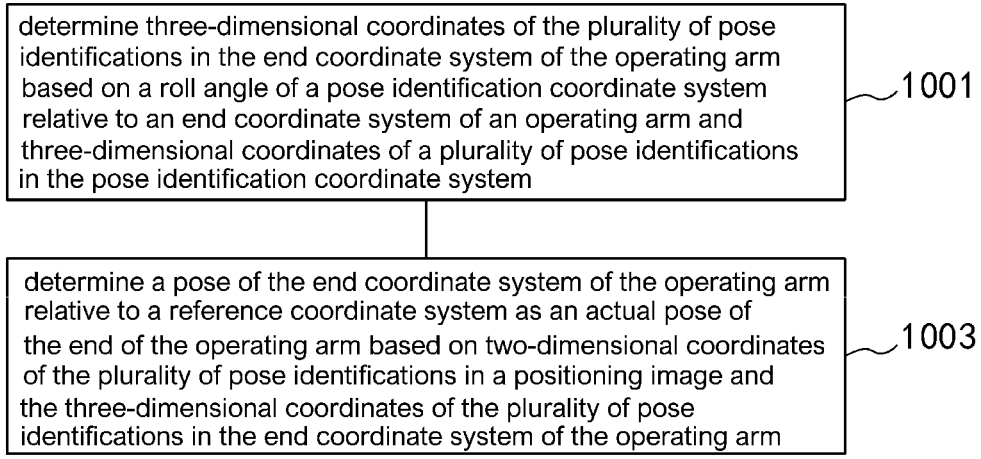
FIG. 10 shows a flowchart of a method for determining an actual pose of the end of the operating arm according to other embodiments of the present disclosure.

Continuing to refer to FIG. 3, at step 309, the actual pose of the end of the operating arm is determined based on the angle identification and the plurality of pose identifications. Exemplary method for obtaining the actual pose of the end of the operating arm includes the methods as shown in FIGS. 9 and 10. In some embodiments, the pose of the end of the operating arm relative to the reference coordinate system may be obtained as the actual pose of the end of the operating arm, based on the angle identification, the first pose identification and the plurality of pose identifications.

In some embodiments, the method 300 further comprises: based on the angle identification and the plurality of pose identifications, determining the transformation relationship between the end coordinate system of the operating arm and a pose identification coordinate system. In some embodiments, according to the transformation relationship between the end coordinate system of the operating arm and the pose identification coordinate system, three-dimensional coordinates in the pose identification coordinate system may be converted into corresponding three-dimensional coordinates in the end coordinate system of the operating arm. In some embodiments, according to the transformation relationship between the end coordinate system of the operating arm and the pose identification coordinate system and a pose of the pose identification coordinate system relative to the reference coordinate system, a pose of the end coordinate system of the operating arm relative to the reference coordinate system is obtained.

In some embodiments, the transformation relationship between the end coordinate system of the operating arm and the pose identification coordinate system may include a roll angle of the pose identification coordinate system relative to the end coordinate system of the operating arm. In some embodiments, the roll angle of the pose identification coordinate system relative to the end coordinate system of the operating arm may be determined based on the angle identification and the first pose identification. It should be understood that the roll angle of the pose identification coordinate system relative to the end coordinate system of the operating arm may be an angle at which the pose identification coordinate system rotates around the Z axis of the end coordinate system of the operating arm.

In some embodiments, the end coordinate system of the operating arm may be a fixed coordinate system set on an object based on the plurality of pose identifications or the plurality of angle identifications. In some embodiments, the Z axis of the end coordinate system of the operating arm is parallel to an axial direction of the operating arm end, and the XY plane of the end coordinate system of the operating arm is in the same plane as the plurality of pose identification pattern corners, or in the same plane as the plurality of angle identification pattern corners.

In some embodiments, the pose identification coordinate system may be determined to facilitate the determination of positions of the plurality of pose identifications. In some embodiments, the positions of the pose identifications may be represented by positions of the pose identification pattern corners. In some embodiments, the Z axis of the pose identification coordinate system is parallel to an axial direction of the operating arm end or coincides with the axial direction, and the XY plane of the pose identification coordinate system is in the same plane as the plurality of pose identification pattern corners.

For example, referring to FIG. 8, the origin of the end coordinate system $\{wm\}=[X_{wm}\ Y_{wm}\ Z_{wm}]^T$ of the operating arm is the circle center of the cross-sectional circle 821 where the plurality of pose identification pattern corners are located, the X-axis direction is that the origin points to one of the pose identification pattern corners, the direction of the Z axis is parallel to the axial direction of the operating arm end 830, and the Y axis is perpendicular to the XZ plane. The X axis of the end coordinate system $\{wm\}$ of the operating arm is parallel to the X axis of the two-dimensional plane coordinate system $\{wm1\}=[X_{wm1}\ Y_{wm1}]^T$ of the cross-sectional circle 811, and the Y axis of the end coordinate system of the operating arm is parallel to the Y axis of the two-dimensional plane coordinate system $\{wm1\}$ of the cross-sectional circle 811. The around-axis angle identified by the angle identification pattern corner in the two-dimensional planar coordinate system $\{wm1\}$ of the section circle 811 may be equal to the around-axis angle identified by it in the end coordinate system $\{wm\}$ of the operating arm. The origin of the pose identification coordinate system $\{wm0\}= [X_{wm0}\ Y_{wm0}\ Z_{wm0}]^T$ is the circle center of the cross-sectional circle 821 where the plurality of pose identification pattern corners are located, the X axis direction is that the origin points to one of the pose identification pattern corners, the direction of the Z axis is parallel to the axial direction of the operating arm end 830, and Y axis is perpendicular to the XZ plane. Continuing to refer to FIG. 8, the Z axis of the end coordinate system $\{wm\}$ of the operating arm coincides with the Z axis of the pose identification coordinate system $\{wm0\}$. The transformation relationship of the end coordinate system $\{wm\}$ of the operating arm relative to the pose identification coordinate system $\{wm0\}$ may be determined by a roll angle $\alpha_0$ of the pose identification coordinate system $\{wm0\}$ relative to the end coordinate system $\{wm\}$ of the operating arm. The roll angle $\alpha_0$ may refer to an angle at which the pose identification coordinate system $\{wm0\}$ rotates relative to the end coordinate system $\{wm\}$ of the operating arm around the Z axis.

In some embodiments, referring to FIG. 8, the roll angle $\alpha_0$ is calculated by the following equation:

$$\alpha_0 = \alpha_1 - \alpha_2 \quad (16)$$

wherein $\alpha_1$ is a first around-axis angle and $\alpha_2$ is a second around-axis angle. The first around-axis angle is an around-axis angle identified by the angle identification pattern corner (for example, the angle identification pattern corner R8) in the end coordinate system of the operating arm. The second around-axis angle is an around-axis angle identified by the first pose identification pattern corner (for example, the pose identification pattern corner P8) in the pose identification coordinate system.

FIG. 9 shows a flowchart of a method 900 for determining an actual pose of the end of the operating arm according to some embodiments of the present disclosure. As shown in FIG. 9, some or all of the steps in the method 900 may be performed by a control device (e.g., a control device 120 as shown in FIG. 1, a control device 220 as shown in FIG. 2 or a control device 1820 as shown in FIG. 18). Some or all of the steps in the method 900 may be implemented by software, firmware, and/or hardware. In some embodiments, the method 900 may be performed by a robot system (e.g., a robot system 100 as shown in FIG. 1, or a robot system 1800 as shown in FIG. 18). In some embodiments, the method 900 may be implemented as computer-readable instructions. These instructions may be read and performed by a general-purpose processor or a dedicated processor (e.g., a control device 1820 as shown in FIG. 18). In some embodiments, these instructions may be stored on a computer-readable medium.

Referring to FIG. 9, at step 901, a roll angle of the pose identification coordinate system relative to the end coordinate system of the operating arm may be determined based on the angle identification and the plurality of pose identifications. In some embodiments, a first around-axis angle identified by the angle identification in the end coordinate system of the operating arm is determined. A second around-axis angle identified by the first pose identification in the pose identification coordinate system is determined. Based on the first around-axis angle and the second around-axis angle, the roll angle of the pose identification coordinate system relative to the end coordinate system of the operating arm is determined. In some embodiments, the roll angle of the pose identification coordinate system relative to the end coordinate system of the operating arm may be determined based on the above equation (16).

At step 903, a pose of the pose identification coordinate system relative to the reference coordinate system is determined based on the plurality of pose identifications. A coordinate of the pose identification in a corresponding coordinate system may be represented by a coordinate of the pose identification pattern corner in the corresponding coordinate system. For example, a two-dimensional coordinate of the pose identification in a positioning image and a three-dimensional coordinate of the pose identification in the pose identification coordinate system may be represented by a coordinate of the pose identification pattern corner. In some embodiments, based on the two-dimensional coordinates of the plurality of pose identification pattern corners in the positioning image and the three-dimensional coordinates of the plurality of pose identification pattern corners in the pose identification coordinate system, the pose of the pose identification coordinate system relative to the reference coordinate system is determined. In some embodiments, the pose of the pose identification coordinate system relative to the reference coordinate system is determined based on the two-dimensional coordinates of the plurality of pose identification pattern corners in the positioning image, the three-dimensional coordinates of the plurality of pose identification pattern corners in the pose identification coordinate system and the transformation relationship of the camera coordinate system relative to the reference coordinate system.

Figure 11:
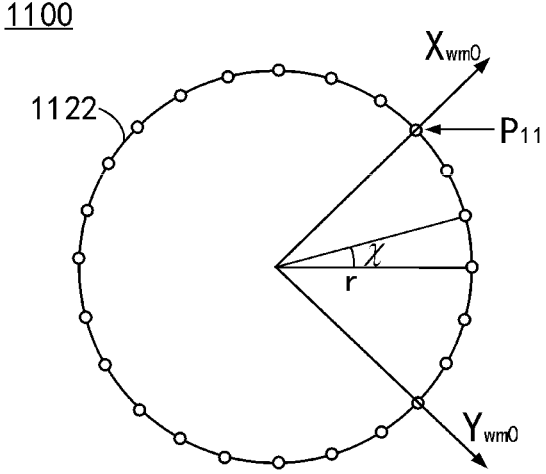
FIG. 11 shows a schematic diagram of a plurality of pose identifications locating on a cross-sectional circle according to some embodiments of the present disclosure.

In some embodiments, the three-dimensional coordinates of the plurality of pose identification pattern corners in the pose identification coordinate system are determined based on a distribution of the plurality of pose identifications. For example, referring to FIG. 11, each pose identification pattern corner is located on the circumference of the cross-sectional circle 1122. The circle center and the radius r of the cross-sectional circle 1122 are known. Assuming that the circle center of the cross-sectional circle 1122 is the origin of the pose identification coordinate system, that the XY plane is located on the cross-sectional circle 1122, and that the X axis may be specified to point from the origin to any determined pose identification pattern corner (e.g., the pose identification pattern corner P11), the three-dimensional coordinate of each pose identification pattern corner in the pose identification coordinate system may be determined based on the distribution of the plurality of pose identifications. For example, as shown in FIG. 11, the three-dimensional coordinate of the pose identification pattern corner P11 in the pose identification coordinate system is (r,0,0), then the three-dimensional coordinates of the remaining pose identification pattern corners in the pose identification coordinate system may be calculated according to the following equation:

$$C_m = [r \cdot \cos((m-1) \cdot \chi) \; r \cdot \sin((m-1) \cdot \chi) \; 0]^T \quad (17)$$

wherein $C_m$ is the three-dimensional coordinate of the m-th pose identification pattern corner in the pose identification coordinate system when taking the pose identification pattern corner P11 as a starting point; $\chi$ is an around-axis angle between adjacent pose identification pattern corners.

In some embodiments, the transformation relationship of the camera coordinate system relative to the reference coordinate system may be known. For example, the reference coordinate system is a world coordinate system, and the transformation relationship of the camera coordinate system relative to the world coordinate system may be determined based on the pose in which the camera is placed. In other embodiments, according to actual needs, the reference coordinate system may also be the camera coordinate system itself.

In some embodiments, based on a camera imaging principle and a projection model, based on the two-dimensional coordinates of the plurality of pose identification pattern corners in the positioning image and the three-dimensional coordinates of the plurality of pose identification pattern corners in the pose identification coordinate system, the pose of the pose identification coordinate system relative to the camera coordinate system is determined. Based on the pose of the pose identification coordinate system relative to the camera coordinate system and the transformation relationship of the camera coordinate system relative to the reference coordinate system, the pose of the pose identification coordinate system relative to the reference coordinate system may be obtained. In some embodiments, the intrinsic parameter of the camera may also be considered. For example, the intrinsic parameter of the camera may be the camera intrinsic parameter of the image acquisition device 250 as shown in FIG. 2. The intrinsic parameter of the camera may be known or obtained by calibration.

In some embodiments, the camera coordinate system may be understood as a coordinate system established at a camera origin. For example, the camera coordinate system may be a coordinate system established with the optical center of the camera as the origin or a coordinate system established with the center of lens of the camera as the origin. When the camera is a binocular camera, the origin of the camera coordinate system may be the center of the left lens of the camera, or the center of the right lens, or any point on a line connecting the centers of the left and right lenses (such as the midpoint of the line).

Referring to FIG. 9, at step 905, based on the roll angle of the pose identification coordinate system relative to the end coordinate system of the operating arm and the pose of the pose identification coordinate system relative to the reference coordinate system, the pose of the end coordinate system of the operating arm relative to the reference coordinate system is determined as the actual pose of the end of the operating arm.

For example, the pose of the end coordinate system of the operating arm relative to the reference coordinate system is specifically as follows:

$$^wR_{wm} = {}^wR_{wm0} \cdot rot_z(\alpha_0)$$

$$^wP_{wm} = {}^wP_{wm0} \quad (18)$$

wherein, $^wR_{wm}$ m is the orientation of the end coordinate system of the operating arm relative to the reference coordinate system, $^wP_{wm}$ is the position of the end coordinate system of the operating arm relative to the reference coordinate system, $^wR_{wm0}$ is the orientation of the pose coordinate system relative to the reference coordinate system, $^wP_{wm0}$ is the position of the pose coordinate system relative to the reference coordinate system, $rot_z(\alpha_0)$ represents rotating around the Z axis of the end coordinate system of the operating arm by the roll angle $\alpha_0$.

In some embodiments, a specific equation for calculating the pose of the end coordinate system of the operating arm relative to the reference coordinate system is as follows:

$$^wR_{wm} = {}^wR_{lens} {}^{lens}R_{wm0} {}^{wm0}R_{wm}$$

$$^wP_{wm} = {}^wR_{lens}({}^{lens}R_{wm0} {}^{wm0}P_{wm} + {}^{lens}P_{wm0}) + {}^wP_{lens} \quad (19)$$

Wherein, $^wR_{lens}$ is the orientation of the camera coordinate system relative to the reference coordinate system, $^{w}P_{lens}$ is the position of the camera coordinate system relative to the reference coordinate system, $^{lens}R_{wm0}$ is the orientation of the pose identification coordinate system relative to the camera coordinate system, $^{lens}P_{wm0}$ is the position of the pose identification coordinate system relative to the camera coordinate system, $^{wm0}R_{wm}$ is the orientation of the end coordinate system of the operating arm relative to the pose identification coordinate system, and $^{wm0}P_{wm}$ is the position of the end coordinate system of the operating arm relative to the pose identification coordinate system.

FIG. 10 shows a flowchart of a method 1000 for determining the actual pose of the end of the operating arm according to other embodiments of the present disclosure. The method 1000 may be an alternative embodiment of the method 900 of FIG. 9. As shown in FIG. 10, some or all of the steps in the method 1000 may be performed by a data processing device (e.g., a control device 120 as shown in FIG. 1, a control device 220 as shown in FIG. 2 or a control device 1820 as shown in FIG. 18). Some or all of the steps in the method 1000 may be implemented by software, firmware, and/or hardware. In some embodiments, the method 1000 may be performed by a robot system (e.g., a robot system 100 as shown in FIG. 1, or a robot system 1800 as shown in FIG. 18). In some embodiments, the method 1000 may be implemented as computer-readable instructions. These instructions may be read and performed by a general-purpose processor or a dedicated processor (e.g., a control device 1820 as shown in FIG. 18). In some embodiments, these instructions may be stored on a computer-readable medium.

Referring to FIG. 10, at step 1001, based on the roll angle of the pose identification coordinate system relative to the end coordinate system of the operating arm and the three-dimensional coordinates of the plurality of pose identifications in the pose identification coordinate system, the three-dimensional coordinates of the plurality of pose identifications in the end coordinate system of the operating arm are determined. It can be understood that the rolling angle of the pose identification coordinate system relative to the end coordinate system of the operating arm is known, and the three-dimensional coordinates of the plurality of pose identification pattern corners in the pose identification coordinate system may be transformed into the three-dimensional coordinates in the end coordinate system of the operating arm according to a coordinate transformation.

At step 1003, based on the two-dimensional coordinates of the plurality of pose identifications in the positioning image and the three-dimensional coordinates of the plurality of pose identifications in the end coordinate system of the operating arm, the pose of the end coordinate system of the operating arm relative to the reference coordinate system is determined as the actual pose of the end of the operating arm. In some embodiments, the step 1003 may be similarly implemented as the steps 903 and 905 in the method 900.

FIG. 12 shows a flowchart of a method 1200 for recognizing a pose identification according to some embodiments of the present disclosure. As shown in FIG. 12, some or all of the steps in the method 1200 may be performed by a data processing device (e.g., a control device 120 as shown in FIG. 1, a control device 220 as shown in FIG. 2 or a control device 1820 as shown in FIG. 18). Some or all of the steps in the method 1200 may be implemented by software, firmware, and/or hardware. In some embodiments, the method 1200 may be performed by a robot system (e.g., a robot system 100 as shown in FIG. 1, or a robot system 1800 as shown in FIG. 18). In some embodiments, the method 1200 may be implemented as computer-readable instructions. These instructions may be read and performed by a general-purpose processor or a dedicated processor (e.g., a control device 1820 as shown in FIG. 18). In some embodiments, these instructions may be stored on a computer-readable medium.

Referring to FIG. 12, at step 1201, a plurality of candidate pose identifications are determined from the positioning image. In some embodiments, the candidate pose identification may be represented by the candidate pose identification pattern corner. In some embodiments, the candidate pose identification pattern corner may refer to a possible pose identification pattern corner obtained after preliminarily processing or preliminarily recognizing the positioning image. In some embodiments, a ROI (Region of Interest) may be cut out from the positioning image firstly, and a plurality of candidate pose identifications may be determined from the ROI. The ROI may be a full image or a partial area of the positioning image. For example, the ROI of the current frame may be cut out based on an area within a certain range of a plurality of pose identification pattern corners, which are determined by a previous frame of image (for example, the positioning image of a previous image processing cycle). For a non-first-frame positioning image, the ROI may be an area within a certain distance range centered on imaginary points formed by coordinates of the plurality of pose identification pattern corners of the previous image processing cycle. The certain distance range may be a fixed multiple of the average interval distance between the pose identification pattern corners, such as twice. It should be understood that a predetermined multiple may also be a variable multiple of the average interval distance between the plurality of candidate pose identification pattern corners in the previous image processing cycle.

In some embodiments, the method 1200 may comprise: determining corner likelihood (CL) values of individual pixels in the positioning image. In some embodiments, the corner likelihood value of the pixel may be a numerical value that characterizes a likelihood of the pixel being a feature point (e.g., a corner). In some embodiments, the positioning image may be preprocessed before calculating the corner likelihood value of each pixel, and then the corner likelihood value of each pixel in the preprocessed image is determined. The preprocessing of the image may include, for example, at least one of image graying, image denoising and image enhancement.

For example, the image preprocessing may include cutting out the ROI from the positioning image and converting the ROI into a corresponding grayscale image.

In some embodiments, the way to determine the corner likelihood value of each pixel in the ROI may include, for example, performing a convolution operation on each pixel in the ROI range to obtain a first and/or second derivatives of each pixel. The first and/or second derivatives of each pixel in the ROI range are used to solve for the corner likelihood value of each pixel. For example, the corner likelihood values of pixels may be calculated according to the following equation:

$$CL = \max(c_{xy}, c_{45})$$

$$c_{xy} = \tau^2 \cdot |I_{xy}| - 1.5 \cdot \tau \cdot (|I_{45}| + |I_{n45}|)$$

$$c_{45} = \tau^2 \cdot |I_{45\_45}| - 1.5 \cdot \tau \cdot (|I_x| + |I_y|) \quad (20)$$

wherein, $\tau$ is a set constant, for example, which is set to 2; $I_x$, $I_{45}$, $I_y$, $I_{n45}$ are the first derivatives of the pixel in the four directions of 0, $\pi/4$, $\pi/2$, $-\pi/4$, respectively; $I_{xy}$ and $I_{45\_45}$ are the second derivatives of the pixel in the directions of 0, π/2 and π/4, −π/4, respectively.

In some embodiments, the ROI is divided into a plurality of sub-images. For example, a non-maximal suppression method may be used to equally segment one ROI range into a plurality of sub-images. In some embodiments, the ROI may be equally segmented into the plurality of sub-images of 5×5 pixels. The above embodiments are for an exemplary purpose, but not for a limiting purpose, and it should be understood that the positioning image or the ROI may also be segmented into a plurality of sub-images of other sizes, for example, segmented into a plurality of sub-images of 9×9 pixels. A pixel with the largest CL value in each sub-image may be determined and compared with a first threshold. A set of pixels with CL values greater than the first threshold is determined. In some embodiments, the first threshold may be set to 0.06. It should be understood that the first threshold may also be set to other values. In some embodiments, the pixel with the CL value greater than the first threshold may be used as a candidate pose identification pattern corner.

Referring to FIG. 12, at step 1203, based on a pose pattern matching template, an initial pose identification is recognized from a plurality of candidate pose identifications. In some embodiments, by matching the pose pattern matching template with an image at one of the candidate pose identification pattern corners, a candidate pose identification pattern corner that meets a preset pose pattern matching degree criterion is determined as the initial pose identification pattern corner.

In some embodiments, the pose pattern matching template has the same or similar features as an image of an area near the pose identification pattern corner. If a matching degree between the pose pattern matching template and the image of the area near the candidate pose identification pattern corner reaches the preset pose pattern matching degree criterion (for example, the matching degree is higher than a threshold), the pattern of the area near the candidate pose identification pattern corner may be considered to have the same or similar features as the pose pattern matching template, and then the current candidate pose identification pattern corner may be considered to be the pose identification pattern corner.

In some embodiments, the pixel with the largest CL value in the set of pixels is determined, as a candidate pose identification pattern corner to be matched. For example, all the pixels in the set of pixels may be ordered in an order of largest to smallest CL values, and the pixel with the largest CL value is treated as the candidate pose identification pattern corner to be matched. After determining the candidate pose identification pattern corner to be matched, the pose pattern matching template is used to match with a pattern at the candidate pose identification pattern corner to be matched, and if the preset pose pattern matching degree criterion is reached, the candidate pose identification pattern corner to be matched is determined to be the recognized initial pose identification pattern corner. If the candidate pose identification pattern corner to be matched does not reach the preset matching degree criterion, a pixel with a secondary CL value (a pixel with the second largest CL value) is selected as a candidate pose identification pattern corner to be matched, the pose pattern matching template is used to match with an image at this candidate pose identification pattern corner, and so on until the initial pose identification pattern corner is recognized.

In some embodiments, the pose identification pattern may be a checkerboard pattern chequered with black and white, so the pose pattern matching template may be the same checkerboard pattern. A correlation Coefficient (CC) between a grayscale distribution $G_M$ of the pose pattern matching template and a pixel neighborhood grayscale distribution $G_{image}$ of the pixel corresponding to the candidate pose identification pattern corner is used for matching. The pixel neighborhood grayscale distribution $G_{image}$ of the pixel is a grayscale distribution of pixels that are within a certain range (for example, 10×10 pixels) centered on that pixel. The specific equation is as follows:

$$CC = \frac{\text{Cov}(G_{image}, G_M)}{\text{Var}(G_{image}) \cdot \text{Var}(G_M)} \quad (21)$$

wherein, Var is a variance function and Cov is a covariance function. In some embodiments, when the CC value is less than 0.8, the grayscale distribution within the pixel neighborhood has a low correlation with the pose pattern matching template, then it is determined that the candidate pose identification pattern corner with the largest corner likelihood value is not the pose identification pattern corner, otherwise it is considered that the candidate pose identification pattern corner with the largest corner likelihood value is the pose identification pattern corner.

Figure 13:
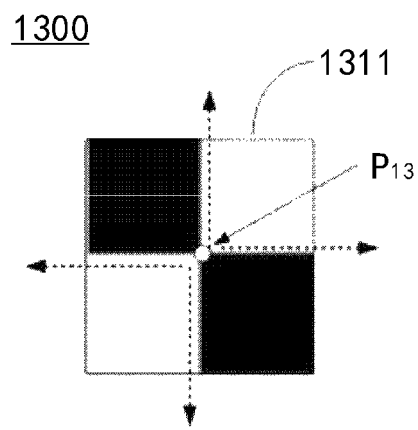
FIG. 13 shows a schematic diagram of a pose identification pattern according to some embodiments of the present disclosure.

In some embodiments, the method 1200 comprises: determining an edge direction of the candidate pose identification pattern corner. For example, as shown in FIG. 13, FIG. 13 includes one pose identification pattern 1311, the candidate pose identification pattern corner is the corner P13 in FIG. 13, then the edge direction of the corner P13 may refer to a direction of an edge forming the corner P13, as the directions indicated by the dashed arrows in FIG. 13.

In some embodiments, the edge direction may be determined by first derivatives ($I_x$ and $I_y$) of each pixel, which is in a neighborhood with a certain range (e.g., 10×10 pixels) centered on the candidate pose identification pattern corner, in the X direction and Y direction of the plane coordinate system. For example, the edge direction may be calculated by the following equation:

$$I_{angle} = \arctan(I_y/I_x), I_{weight} = \sqrt{I_x^2 + I_y^2} \quad (22)$$

wherein, the first derivatives ($I_x$ and $I_y$) may be obtained by performing a convolution operation on each pixel within a neighborhood with a certain range. In some embodiments, the edge direction of the pixel may be obtained by performing a clustering calculation on the edge direction $I_{angle}$ of the pixel within each neighborhood with a range and a corresponding weight $I_{weight}$, and a $I_{angle}$ corresponding to a cluster with the largest proportion for the weight $I_{weight}$ is selected as the edge direction. It should be noted that if there are a plurality of edge directions, $I_{angle}$ corresponding to a plurality of clusters with the largest proportion for the weight $I_{weight}$ are selected as the edge directions.

In some embodiments, the method used for the clustering calculation may be any of K-means method, BIRCH (Balanced Iterative Reducing and Clustering using Hierarchies) method, DBSCAN (Density-Based Spatial Clustering of Applications with Noise) method, GMM (Gaussian Mixed Model) method.

In some embodiments, the method 1200 comprises: rotating the pose pattern matching template according to the edge direction. Rotating the pose pattern matching template according to the edge direction may align the pose pattern matching template with the image at the candidate pose identification pattern corner.

The edge orientation of the candidate pose identification pattern corner may be used to determine a set direction of the image at the candidate identification pattern corner in the positioning image. In some embodiments, rotating the pose pattern matching template according to the edge direction may adjust the pose pattern matching template to the same direction or approximately the same direction as the image at the candidate pose identification pattern corner, for image matching.

Referring to FIG. 12, at step 1205, the pose identification is searched, with the initial pose identification as a starting point.

FIG. 14 shows a flowchart of a method 1400 for searching for the pose identification according to some embodiments of the present disclosure. As shown in FIG. 14, some or all of the steps in the method 1400 may be performed by a data processing device (e.g., a control device 120 as shown in FIG. 1, a control device 220 as shown in FIG. 2 or a control device 1820 as shown in FIG. 18). Some or all of the steps in the method 1400 may be implemented by software, firmware, and/or hardware. In some embodiments, the method 1400 may be performed by a robot system (e.g., a robot system 100 as shown in FIG. 1, or a robot system 1800 as shown in FIG. 18). In some embodiments, the method 1400 may be implemented as computer-readable instructions. These instructions may be read and performed by a general-purpose processor or a dedicated processor (e.g., a control device 1820 as shown in FIG. 18). In some embodiments, these instructions may be stored on a computer-readable medium.

Referring to FIG. 14, at step 1401, a second pose identification is determined, with the initial pose identification as the starting point. In some embodiments, with the initial pose identification pattern corner as the starting point, the second pose identification pattern corner is searched for in a set searching direction. In some embodiments, the set searching direction may comprise at least one of directly forward (corresponding to an angle direction of) 0°, directly backward (corresponding to an angle direction of 180°), directly upward (an angle direction of) 90°, directly downward (an angle direction of −90°) and oblique (such as an angle direction of)+45° with respect to the initial pose identifications pattern corner.

In some embodiments, the number of the set searching directions is n. For example, the searching is performed in 8 directions, and each searching direction $v_{sn}$ may be calculated according to the following equation:

$$v_{sn}=\cos(n\cdot\pi/4)\sin(n\cdot\pi/4),(n=1,2,\ldots,8) \quad (23)$$

In some embodiments, the searching direction set in the current step may be determined according to a deviation angle between adjacent pose identification pattern corners in the plurality of pose identification pattern corners determined in a previous frame. For example, a predetermined searching direction may be calculated according to the following equation:

$$\bar{\theta} = \left[\sum_{j=1}^{n_{last}-1} \mathrm{atan2}(y_{j+1} - y_j, x_{j+1} - x_j)\right]/(n_{last} - 1) \quad (24)$$

$$v_{s1} = [\cos(\bar{\theta})\ \sin(\bar{\theta})], v_{s2} = -v_{s1}$$

wherein, $(x_j, y_j)$ is two-dimensional coordinates of the plurality of pose identification pattern corners determined for the previous frame (or a previous image processing cycle); $n_{last}$ is the number of the plurality of pose identification pattern corners determined for the previous frame; $V_{s1}$ is a first set searching direction; and $V_{s2}$ is a second set searching direction.

Figure 15:
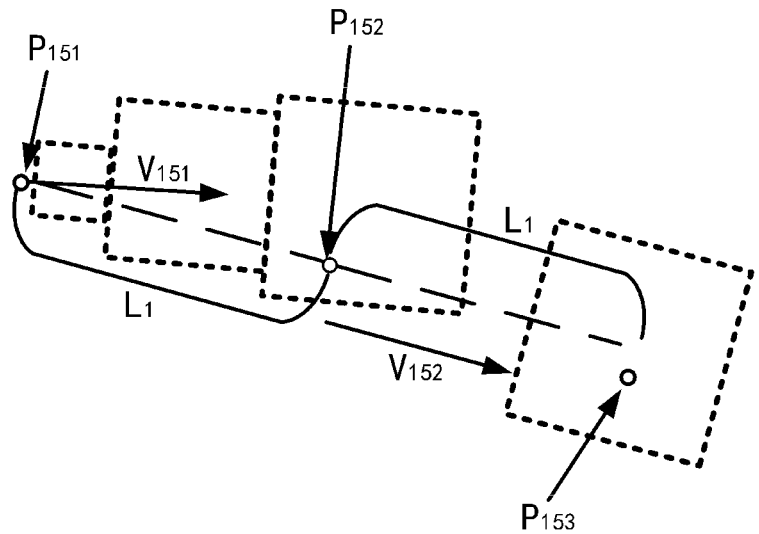
FIG. 15 shows a schematic diagram of searching for the pose identification according to some embodiments of the present disclosure.

In some embodiments, as shown in FIG. 15, searching for a coordinate position of the second pose identification pattern corner P152 in the set searching direction, with a coordinate position of the initial pose identification pattern corner P151 as the starting point for searching, may specifically comprise: with the coordinate position of the initial pose identification pattern corner P151 as the starting point for searching, searching for the pose identification pattern corner in the set searching direction V151 with a certain searching step size through a searching box (e.g., a dotted box in FIG. 15). If there is at least one candidate pose identification pattern corner in the searching box, a candidate pose identification pattern corner with the largest corner likelihood value in the searching box is preferentially selected to be the second pose identification pattern corner P152. In the case that the searching box is limited to a suitable size, when performing the searching for the second pose identification pattern corner P152 with the coordinate position of the initial pose identification pattern corner P151 taken as the starting point for searching, the candidate pose identification pattern corner with the largest corner likelihood value among candidate pose identification pattern corners appearing in the searching box is more likely to be the pose identification pattern corner. Therefore, the candidate pose identification pattern corner with the largest corner likelihood value in the searching box may be considered as the second pose identification pattern corner P152, so as to improve a speed of the data processing. In other embodiments, in order to improve the accuracy of pose identification pattern corner recognition, the candidate pose identification pattern corner with the largest corner likelihood value among candidate pose identification pattern corners appearing in the searching box is selected for a corner recognition, to determine whether the candidate pose identification pattern corner with the largest corner likelihood value is the pose identification pattern corner. For example, the pose pattern matching template is matched with an image within a certain range around the candidate pose identification pattern corner with the largest corner likelihood value, and the candidate pose identification pattern corner that meets the preset pose pattern matching degree criterion may be regarded as the searched second pose identification pattern corner P152.

In some embodiments, continuing to refer to FIG. 15, the size of the searching box may be gradually increased, thereby gradually increasing a searching range. The searching step size may change synchronously with an edge length of the searching box. In other embodiments, the size of the searching box may also be a fixed size.

In some embodiments, the pose identification pattern may be a checkerboard pattern chequered with black and white, and the correlation coefficient CC in the equation (21) may be used for pattern matching. If the CC is greater than the threshold, the candidate pose identification pattern corner with the largest corner likelihood value is considered to be the pose identification pattern corner, and marked as the second pose identification pattern corner.

Referring to FIG. 14, at step 1403, the searching direction is determined based on the initial pose identification and the second pose identification. In some embodiments, the searching direction comprises: a first searching direction and a second searching direction. The first searching direction may be a direction that starts from the coordinate position of the initial pose identification pattern corner and is away from the second pose identification pattern corner. The second searching direction may be a direction that starts from the coordinate position of the second pose identification pattern corner and is away from the first pose identification pattern corner. For example, the searching direction V152 as shown in FIG. 15.

At step 1405, with the initial pose identification or the second pose identification as a starting point, the pose identification is searched in the searching direction. In some embodiments, if the first pose identification pattern corner is used as a new starting point, the first searching direction in the above embodiment may be used as a searching direction for the searching for the pose identification pattern corner. If the second pose identification pattern corner is used as a new starting point for searching, the second searching direction in the above embodiment may be used as a searching direction for the searching for the pose identification pattern corner. In some embodiments, searching for a new pose identification pattern corner (e.g., a third pose identification pattern corner P153 in FIG. 15) may be performed similarly to the step 1401. In some embodiments, the searching step size may be a distance L1 between the initial pose identification pattern corner and the second pose identification pattern corner.

In some embodiments, in response to the number of the searched pose identification pattern corners is greater than or equal to a number threshold of the pose identification pattern corners, the searching for the pose identification pattern corner is stopped. For example, when four pose identification pattern corners are searched (recognized), the searching for the pose identification pattern corner is stopped.

In some embodiments, in response to a distance of the searching being greater than a set multiple of a distance between the N−1-th pose identification pattern corner and the N−2-th pose identification pattern corner, the searching for the Nth pose identification pattern corner is stopped, wherein N≥3. For example, an end condition for the searching may be that the distance of the searching is greater than twice the distance between the previous two pose identification pattern corners. Thus, the maximum searching distance for searching for the third pose identification pattern corner is twice the distance between the initial pose identification pattern corner and the second pose identification pattern corner. If the pose identification pattern corner has not been found when reaching this searching distance, it is considered that the third pose identification pattern corner is not found and the searching ends.

In some embodiments, if the total number of the searched pose identification pattern corners is greater than or equal to a set threshold (e.g., the set threshold is 4), it is considered that sufficient pose identification pattern corners have been successfully recognized. If the total number of the found pose identification pattern corners is less than the set numerical value, the searching based on the initial pose identification pattern corner in the above step is considered to be unsuccessful. In the case that the searching is unsuccessful, a new initial pose identification pattern corner is redetermined from the candidate pose identification pattern corners, and then the remaining pose identification pattern corners are searched based on the redetermined initial pose identification pattern corner as the starting point for searching. Similar to the method 1200, the new initial pose identification pattern corner may be redetermined, and similar to the method 1400, with the new pose identification pattern corner as the starting point for searching, the remaining pose identification pattern corners may be searched.

In some embodiments, after the pose identification pattern corner is searched or recognized, the determined pose identification pattern corner may also be subpixel positioned to improve the position accuracy of the pose identification pattern corner.

In some embodiments, the CL values of the pixels may be fitted based on a model, to determine coordinates of the pose identification pattern corners after being subpixel positioned. For example, a fitting function for the CL value of each pixel in the ROI may be a quadric function, and the extreme points of this function are subpixels. The fitting function may be as follows:

$$S(x, y) = ax^2 + by^2 + cx + dy + exy + f \quad (25)$$

$$x_c = \frac{de - 2bc}{4ab - e^2}, y_c = \frac{ce - 2ad}{4ab - e^2} \quad (26)$$

wherein, $S(x,y)$ is a fitting function for CL values of all pixels in each ROI, a, b, c, d, e, and f are coefficients; $x_c$ is the x-coordinate of the pose identification, and $y_c$ is the y-coordinate of the pose identification.

FIG. 16 shows a flowchart of a method 1600 for recognizing an angle identification according to some embodiments of the present disclosure. As shown in FIG. 16, some or all of the steps in the method 1600 may be performed by a data processing device (e.g., a control device 120 as shown in FIG. 1, a control device 220 as shown in FIG. 2 or a control device 1820 as shown in FIG. 18). Some or all of the steps in the method 1600 may be implemented by software, firmware, and/or hardware. In some embodiments, the method 1600 may be performed by a robot system (e.g., a robot system 100 as shown in FIG. 1, or a robot system 1800 as shown in FIG. 18). In some embodiments, the method 1600 may be implemented as computer-readable instructions. These instructions may be read and performed by a general-purpose processor or a dedicated processor (e.g., a control device 1820 as shown in FIG. 18). In some embodiments, these instructions may be stored on a computer-readable medium.

Referring to FIG. 16, at step 1601, an imaging transformation relationship is determined based on two-dimensional coordinates of the plurality of pose identifications in the positioning image and three-dimensional coordinates of the plurality of pose identifications in the pose identification coordinate system. In some embodiments, the pose identification coordinate system may be the pose identification coordinate system described in detail in the embodiment shown in the method 300. For example, the pose identification coordinate system is as shown in FIG. 8. In some embodiments, the imaging transformation relationship may refer to a transformation relationship between a three-dimensional coordinate in the pose identification coordinate system and a two-dimensional coordinates in the positioning image. It should be understood that based on the imaging transformation relationship, it is also possible to transform the two-dimensional coordinate in the positioning image into the three-dimensional coordinate in the pose identification coordinate system. In some embodiments, the three-dimensional coordinates of the plurality of pose identifications in the pose identification coordinate system may be determined based on the equation (17). In some embodiments, the number of the plurality of pose identifications may be greater than or equal to 4. For example, the imaging transformation relationship may be obtained based on two-dimensional coordinates of 4 pose identifications in the positioning image and the corresponding 4 three-dimensional coordinates in the pose identification coordinate system.

Referring to FIG. 16, at step 1603, a plurality of angle identification candidate areas are determined in the positioning image based on the imaging transformation relationship, the three-dimensional coordinates of the plurality of pose identifications in the pose identification coordinate system, and the position association relationship. In some embodiments, the angle identification candidate area may represent a candidate area of the angle identification pattern. In some embodiments, based on the three-dimensional coordinates of the plurality of pose identification pattern corners in the pose identification coordinate system and the position association relationship, a plurality of angle identification pattern corner candidate three-dimensional coordinates are determined in the pose identification coordinate system. For example, according to the three-dimensional coordinates of the plurality of pose identification pattern corners in the pose identification coordinate system, a plurality of three-dimensional coordinates in the pose identification coordinate system may be determined by shifting by a certain distance along an axial direction. These three-dimensional coordinates are represented by the plurality of angle identification pattern corner candidate three-dimensional coordinates. For example, referring to FIG. 6, the position association relationship is that an angle identification and a corresponding pose identification are separated by a certain distance along the Z axis of the pose identification coordinate system. Under the premise of determining a position of the pose identification pattern corner, a position obtained by moving a certain distance in a positive or negative direction of the Z axis may be considered as a candidate position of the angle identification pattern corner in the pose identification coordinate system.

In some embodiments, based on the imaging transformation relationship and the plurality of angle identification pattern corner candidate three-dimensional coordinates, a plurality of angle identification candidate areas are determined in the positioning image. For example, based on the imaging transformation relationship and the plurality of angle identification pattern corner candidate three-dimensional coordinates, a plurality of angle identification pattern corner candidate two-dimensional coordinates are obtained in the positioning image. In some embodiments, based on the plurality of angle identification pattern corner candidate two-dimensional coordinates, a plurality of angle identification pattern candidate areas are determined. For example, with each angle identification pattern corner candidate two-dimensional coordinate as a center, an area with a certain range size (for example, 5×5 pixels, 10×10 pixels, and so on) is determined in the positioning image as the angle identification candidate area. In some embodiments, the area with the certain range size is greater than or equal to a size of the angle identification pattern after being imaged. The size of the angle identification pattern after being imaged may be obtained based on an actual size of the angle identification pattern and the imaging transformation relationship.

Referring to FIG. 16, at step 1605, the angle identification is recognized from the plurality of angle identification candidate areas. In some embodiments, the angle identification includes an angle identification pattern and an angle identification pattern corner. In some embodiments, the method 1600 may include determining a pixel with the largest corner likelihood value in each angle identification candidate area to form a set of pixels. In some embodiments, the corner likelihood value of the pixel may be calculated when performing the method 1200, or may be recalculated based on the equation (20). The method 1600 further comprises determining an angle identification candidate area corresponding to the pixel with the largest corner likelihood value in the set of pixels, as an angle identification candidate area to be recognized. The method 1600 further comprises using a plurality of angle pattern matching templates to respectively match with the angle identification candidate area to be recognized, to recognize the angle identification. In some embodiments, the angle identification pattern is a pattern with different graphic features. The plurality of angle pattern matching templates may refer to standard angle pattern templates with the same or similar graphic features and corresponding to the plurality of angle identification patterns respectively. In some embodiments, by determining the plurality of angle identification candidate areas, the recognition of the angle identification may be performed in the plurality of angle identification candidate areas, thus avoiding the recognition of the angle identification to be performed within the entire image range, and improving the speed of data processing.

In some embodiments, any template matching algorithm of squared difference matching method, normalized squared difference matching method, correlation matching method, normalized correlation matching method, correlation coefficient matching method, and normalized correlation coefficient matching method may be used to perform a matching operation on the angle pattern matching template and the angle identification candidate area.

In some embodiments, since the angle pattern matching template and the angle identification pattern have the same or similar graphic features, pattern information of the angle identification may include pattern information of the corresponding angle pattern matching template, for example, a shape of the angle pattern matching template, feature that may be recognized in the image, and so on. In some embodiments, each angle pattern matching template has a one-to-one correspondence relationship with the around-axis angle recognized by the corresponding angle identification pattern. A first around-axis angle is determined based on the pattern information of a specific angle pattern matching template or the angle identification pattern corresponding to the recognized angle identification.

In some embodiments, the method 1600 may include: in response to the matching failing, determining the angle identification candidate area corresponding to a pixel with the largest corner likelihood value of the remaining pixels of the set of pixels, as the angle identification candidate area to be recognized. In some embodiments, after determining a new angle identification candidate area to be recognized, the plurality of angle pattern matching templates are used to match with the angle identification candidate area to be recognized respectively, to recognize the angle identification.

In some embodiments, based on the angle identification candidate area where the recognized angle identification is located, a first pose identification having a position association relationship with the angle identification is determined. In some embodiments, the plurality of angle identification candidate areas correspond to at least one of the plurality of recognized pose identification pattern corners respectively, and after determining the angle identification candidate area where the recognized angle identification is located, the first pose identification pattern corner may be determined based on the correspondence relationship between the plurality of angle identification candidate areas and the plurality of pose identification pattern corners.

Continuing to refer to FIG. 3, at step 311, in response to the target pose and the actual pose meeting the error detection condition, a control signal related to a fault is generated. After obtaining the target pose and the actual pose of the end of the operating arm, the control device determines a pose error of the end of the operating arm, to determine whether the operating arm is correctly reached a position and an orientation expected by the operator, and then determine whether the robot system is faulty. In some embodiments, when the target pose and the actual pose of the operating arm meet the error detection condition (e.g., greater than or equal to an error threshold), the control device determines that the operating arm has not correctly moved to the position and an orientation corresponding to the master manipulator, and sends out the control signal association with the fault. For example, the control device may send out a first alarm signal indicating that the control of the operating arm has failed.

In some embodiments, the control device may obtain a plurality of sets of target poses and actual poses of the operating arm in real time in a remote operation, and a running state of the operating arm is comprehensively determined based on the plurality of sets of target poses and actual poses. In some embodiments, the control device may determine the target poses and the actual poses of the end of the operating arm at a predetermined period, perform error detections on the operating arm through a plurality of detection cycles, apply a mathematical statistical method to analyze a plurality of sets of errors, and send out the control signal related to the fault when the error detection condition is met.

For example, in the k-th error detection cycle, a pose difference may be represented as follows:

$$\begin{cases} \varepsilon_P^k = P_t^k - P_r^k \\ \varepsilon_R^k = \Delta\theta(R_t^k, R_r^k) \end{cases} \quad (27)$$

wherein, $\varepsilon_P^k$ is a position difference of the operating arm in the k-th error P detection cycle, $\varepsilon_R^k$ k is an angle difference of the operating arm in the k-th error detection $R_t^k$ cycle, $P_t^k$ is a target position of the operating arm in the k-th error detection cycle, $R_t^k$ is a target orientation of the operating arm in the k-th error detection cycle, $P_r^k$ is an actual position of the operating arm in the k-th error detection cycle, $R_r^k$ is an actual orientation of the operating arm in the k-th error detection cycle, and $\Delta\theta(R_t^k, R_r^k)$ represents a rotating angle between $R_r^k$ and $R_t^k$.

In some embodiments, the control device may store errors obtained in the plurality of detection cycles into a memory, and accumulate these errors. When the accumulated value of the errors meets the error detection condition (e.g., exceeding the threshold), the control device may send out a control signal association with the fault.

In some embodiments, the method 300 further comprises: in response to the target pose and the actual pose meeting the error detection condition, receiving status information of at least one drive device for driving the operating arm; and in response to the status information and drive information of the at least one drive device meeting a fault detection condition, sending out a second alarm signal indicating that the drive device of the operating arm has failed.

In some embodiments, the drive device is provided with a drive device sensor, and the drive device sensor is coupled to the drive device and used to obtain the status information of the drive device. For example, the drive device may include at least one drive motor, the drive device sensor may include a potentiometer or an encoder, and the drive device sensor is coupled with the drive motor to record and output the status information of the motor. The control device sends the drive information to the at least one drive device based on the target pose of the end of the operating arm, and receives, through the drive device sensor, the status information of the at least one drive device for driving the operating arm. When the status information and the drive information meet the fault detection condition (e.g., greater than or equal to an error threshold), the control device sends out a second alarm signal indicating that at least one drive device for driving the operating arm has failed.

In some embodiments of the present disclosure, the present disclosure further provides a computer device comprising a memory and a processor. The memory may be used to store at least one instruction. The processor is coupled to the memory, and is configured to execute the at least one instruction to perform some or all of the steps of the methods of the present disclosure, such as some or all of the steps of the methods disclosed in FIGS. 3-4, 9-10, 12, 14 and 16.

Figure 17:
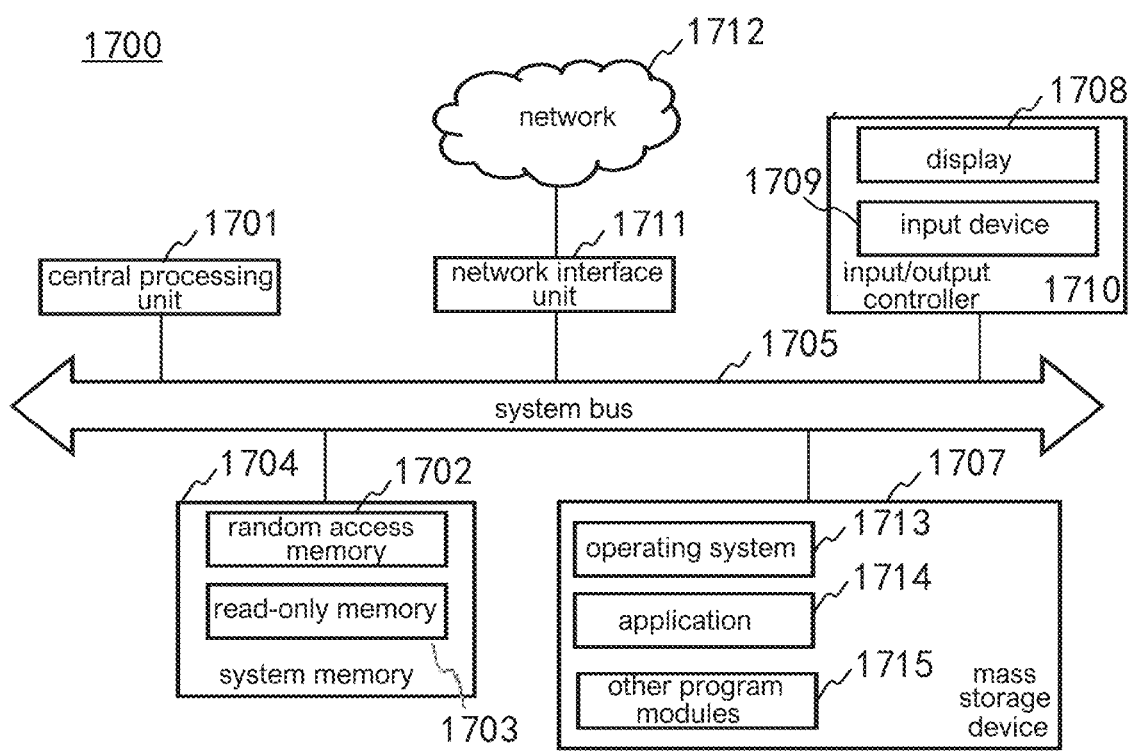
FIG. 17 shows a schematic block diagram of a computer device according to some embodiments of the present disclosure.

FIG. 17 shows a schematic block diagram of a computer device 1700 according to some embodiments of the present disclosure. Referring to FIG. 17, the computer device 1700 may include a central processing unit (CPU) 1701, a system memory 1704 including a random access memory (RAM) 1702 and a read-only memory (ROM) 1703, and a system bus 1705 connecting the various components. The computer device 1700 may further include an input/output system, and a mass storage device 1707 for storing an operating system 1713, application 1714 and other program modules 1715. The input/output device comprises an input/output controller 1710 mainly comprising a display 1708 and an input device 1709.

The mass storage device 1707 is connected to the central processing unit 1701 via a mass storage controller (not shown) connected to the system bus 1705. The mass storage device 1707 or a computer-readable medium provides non-volatile storage for the computer device. The mass storage device 1707 may include a computer-readable medium (not shown) such as a hard disk or a Compact Disc Read-Only Memory (CD-ROM) drive or the like.

Without loss of generality, the computer-readable medium may include a computer storage medium and a communication medium. The computer storage medium includes a volatile and non-volatile, removable and non-removable medium implemented by any of methods or technologies for storing information such as computer-readable instructions, data structures, program modules, or other data and the like. The computer storage medium includes RAM, ROM, a flash memory or other solid-state memory technologies, CD-ROM, or other optical storage, a tape cartridge, a magnetic tape, magnetic disk storage, or other magnetic storage devices. Of course, those skilled in the art will know that the computer storage medium is not limited to the above. The above system memory and mass storage device may be collectively referred to as memory.

The computer device 1700 may be connected to a network 1712 via a network interface unit 1711 connected to the system bus 1705.

The system memory 1704 or the mass storage device 1707 is also used to store one or more instructions. The central processor 1701 implements all or some of the steps of the methods in some embodiments of the present disclosure by executing the one or more instructions.

In some embodiments of the present disclosure, the present disclosure further provides a computer-readable storage medium in which at least one instruction is stored. The at least one instruction is executed by the processor to enable the computer to perform some or all of the steps of the methods in some embodiments of the present disclosure, such as some or all of the steps of the methods disclosed in FIGS. 3-4, 9-10, 12, 14 and 16. Examples of the computer-readable storage medium include a memory for computer programs (instructions), e.g., a read-Only Memory (ROM), a Random Access Memory (RAM), Compact Disc Read-Only Memory (CD-ROM), a magnetic tape, a floppy disk, and an optical data storage device.

FIG. 18 shows a schematic diagram of a robot system 1800 according to some embodiments of the present disclosure. As shown in FIG. 18, the robot system 1800 comprises: a master manipulator 1810, a control device 1820, a drive device 1860, a slave tool 1850, and an image acquisition device 1870. The master manipulator 1810 includes a robotic arm, a handle disposed on the robotic arm, and at least one master manipulator sensor disposed at at least one joint on the robotic arm. The at least one master manipulator sensor is used for obtaining joint information of the at least one joint. In some embodiments, the master manipulator 1810 includes a six-degree-of-freedom robotic arm. One master manipulator sensor is provided at each joint on the six-degree-of-freedom robotic arm, and joint information (e.g., joint angle data) is generated by the master manipulator sensor of each joint. In some embodiments, the master manipulator sensor uses a potentiometer and/or an encoder. An operating arm 1840 is provided on the slave tool 1850, and in some embodiments, the operating arm 1840 comprises a multi-segment continuum deformable arm. At least one angle identification and a plurality of pose identifications may be formed or provided on an end 1830 of the operating arm 1840, and an effector may be provided at a distal end of the end 1830. The image acquisition device 1870 may be used to acquire a positioning image of the operating arm 1840. The drive device 1860 is used for driving the operating arm 1840, and at least one drive device sensor is coupled with at least one drive device and for obtaining drive information. The control device 1820 is communicatively connected to the master manipulator 1810, the at least one drive device 1860 and the image acquisition device 1870, and is configured to perform some or all of the steps in the methods as disclosed in FIGS. 3-4, 9-10, 12, 14 and 16.

The robot has a high requirement for operation accuracy and human-computer interaction experience. During an operation of the robot system, if the operating arm cannot move to a target position and orientation accurately and quickly, it will reduce the operation experience of an operator, and even lead to a failure of an operation, resulting in unnecessary risks. In the embodiments of the present disclosure, by detecting the actual pose of the operating arm, and comparing it, in real time, with the target pose of the operating arm desired by the operator, the risk of fault existed may be found. The embodiments of the present disclosure may improve an operability and safety of the robot system, and reduce an operational risk caused by a pose error of the operating arm during the operation of the robot system.

Note that the above are only exemplary embodiments of the present disclosure and the applied technical principles. Those skilled in the art will appreciate that the present disclosure is not limited to specific embodiments herein, and those skilled in the art can make various apparent changes, readjustments and substitutions without departing from the scope of protection of the present disclosure. Thus, although the present disclosure is described in more detail by the above embodiments, the present disclosure is not limited to the above embodiments. Without departing from the concept of the present disclosure, more other equivalent embodiments may be included, and the scope of the present disclosure is determined by the scope of the appended claims.

The invention claimed is:

1. An error detection method comprising:
   determining, in a plurality of error detection cycles, a plurality of pose differences of an end of an operating arm;
   accumulating the plurality of the pose differences; and
   generating, in response to an accumulated value of the plurality of pose differences meeting an error detection condition, a control signal related to a fault,
   wherein the method further comprises: in each error detection cycle,
      obtaining a target pose of the end of the operating arm;
      acquiring a positioning image;
      recognizing, in the positioning image, a plurality of pose identifications located on the end of the operating arm;
      recognizing, based on the plurality of pose identifications, an angle identification located on the end of the operating arm, the angle identification having a position association relationship with a first pose identification of the plurality of pose identifications;
      determining, based on the angle identification and the plurality of pose identifications, an actual pose of the end of the operating arm; and
      determining, based on the target pose and the actual pose, a pose difference of the end of the operating arm,
   wherein recognizing the plurality of pose identifications located on the end of the operating arm comprises:
      determining a plurality of candidate pose identifications from the positioning image;
      recognizing, based on a pose pattern matching template, an initial pose identification from the plurality of candidate pose identifications;
      searching for a remaining pose identification in eight searching directions that are associated with the initial pose identification, with an initial pose identification pattern corner of the initial pose identification as a starting point; and
      stopping searching for the pose identification, in response to the number of the recognized pose identifications being greater than or equal to a pose identification number threshold, or
      redetermining, in response to the number of the recognized pose identifications being less than the pose identification number threshold and a distance of the searching being greater than twice a distance between previous two pose identification pattern corners of the recognized pose identifications, the initial pose identification from the plurality of candidate pose identifications based on the pose pattern matching template,
   wherein determining the actual pose of the end of the operating arm comprises:
      determining a roll angle of a pose identification coordinate system relative to an end coordinate system of the operating arm based on the angle identification and the plurality of pose identifications;
      determining a pose of the pose identification coordinate system relative to a reference coordinate system based on two-dimensional coordinates of the plurality of pose identifications in the positioning image and three-dimensional coordinates of the plurality of pose identifications in the pose identification coordinate system; and determining a pose of the end coordinate system of the operating arm relative to the reference coordinate system as the actual pose based on the roll angle of the pose identification coordinate system relative to the end coordinate system of the operating arm and the pose of the pose identification coordinate system relative to the reference coordinate system, or wherein determining the actual pose of the end of the operating arm comprises:

determining a roll angle of a pose identification coordinate system relative to an end coordinate system of the operating arm based on the angle identification and the plurality of pose identifications;

determining three-dimensional coordinates of the plurality of pose identifications in the end coordinate system of the operating arm based on the roll angle of the pose identification coordinate system relative to the end coordinate system of the operating arm and three-dimensional coordinates of the plurality of pose identifications in the pose identification coordinate system; and determining a pose of the end coordinate system of the operating arm relative to a reference coordinate system as the actual pose based on two-dimensional coordinates of the plurality of pose identifications in the positioning image and three-dimensional coordinates of the plurality of pose identifications in the end coordinate system of the operating arm, wherein the control signal related to the fault comprises a first alarm signal indicating that the control of the operating arm has failed, and the method further comprises:

receiving status information of at least one drive device for driving the operating arm, in response to the target pose and the actual pose meeting an error detection condition; and sending out a second alarm signal in response to the status information and drive information of the at least one drive device meeting a fault detection condition, the second alarm signal indicating that a drive device of the operating arm has failed.

2. The method according to claim 1, wherein obtaining the target pose of the end of the operating arm comprises:

determining a current pose of a master manipulator; and determining, based on the current pose of the master manipulator and a pose relationship between the master manipulator and the end of the operating arm, the target pose of the end of the operating arm.

3. The method according to claim 2, wherein the pose relationship comprises at least one of:

an amount of position change of the end of the operating arm in the reference coordinate system being proportional to an amount of position change of the master manipulator in the reference coordinate system; or an amount of orientation change of the end of the operating arm in the reference coordinate system being consistent with an amount of orientation change of the master manipulator in the reference coordinate system; or an orientation of the end of the operating arm in the reference coordinate system being consistent with an orientation of the master manipulator in the reference coordinate system.

4. The method according to claim 2, further comprising:

determining a current pose of a handle of the master manipulator relative to a master manipulator base coordinate system;

determining a previous pose of the handle relative to the master manipulator base coordinate system;

determining a starting pose of the end of the operating arm relative to an operating arm base coordinate system; and determining a target pose of the end of the operating arm relative to the operating arm base coordinate system based on the previous pose and the current pose of the handle relative to the master manipulator base coordinate system, a transformation relationship between the operating arm base coordinate system and the master manipulator base coordinate system, and the starting pose of the end of the operating arm relative to the operating arm base coordinate system.

5. The method according to claim 4, further comprising:

determining the transformation relationship between the operating arm base coordinate system and the master manipulator base coordinate system based on a transformation relationship between the operating arm base coordinate system and a camera coordinate system, a transformation relationship between the camera coordinate system and a display coordinate system, and a transformation relationship between the display coordinate system and the master manipulator base coordinate system.

6. The method according to claim 5, wherein, the operating arm base coordinate system has a predetermined transformation relationship with the camera coordinate system.

7. The method according to claim 2, further comprising:

receiving current joint information of at least one joint of the master manipulator; and determining a current pose of the master manipulator based on the current joint information of the at least one joint of the master manipulator.

8. The method according to claim 4, further comprising:

receiving previous joint information of at least one joint of the master manipulator;

determining a previous pose of the master manipulator based on the previous joint information of the at least one joint of the master manipulator; and receiving an actual pose of the end of the operating arm obtained in a previous round of detection cycle, as a starting pose of the end of the operating arm.

9. The method according to claim 1, comprising:

determining a first around-axis angle identified by the angle identification in the end coordinate system of the operating arm;

determining a second around-axis angle identified by the first pose identification in the pose identification coordinate system; and determining the roll angle of the pose identification coordinate system relative to the end coordinate system of the operating arm based on the first around-axis angle and the second around-axis angle.

10. The method according to claim 1, wherein the position association relationship comprises:

a correspondence relationship between the angle identification and the first pose identification in an axial direction.

11. The method according to claim 1, comprising:
- determining three-dimensional coordinates of the plurality of pose identifications in a pose identification coordinate system based on a distribution of the plurality of pose identifications;
- determining an imaging transformation relationship based on two-dimensional coordinates of the plurality of pose identifications in the positioning image and three-dimensional coordinates of the plurality of pose identifications in the pose identification coordinate system;
- determining a plurality of angle identification candidate areas in the positioning image based on the imaging transformation relationship, the three-dimensional coordinates of the plurality of pose identifications in the pose identification coordinate system, and the position association relationship; and
- recognizing the angle identification from the plurality of angle identification candidate areas.

12. The method according to claim 11, comprising:
- determining a plurality of angle identification candidate three-dimensional coordinates in the pose identification coordinate system based on the three-dimensional coordinates of the plurality of pose identifications in the pose identification coordinate system and the position association relationship; and
- determining the plurality of angle identification candidate areas in the positioning image based on the imaging transformation relationship and the plurality of angle identification candidate three-dimensional coordinates.

13. The method according to claim 12, comprising:
- determining a pixel with a largest corner likelihood value in each of the angle identification candidate areas to form a set of pixels;
- determining an angle identification candidate area corresponding to a pixel with the largest corner likelihood value in the set of pixels, as an angle identification candidate area to be recognized; and
- using a plurality of angle pattern matching templates to respectively match with the angle identification candidate area to be recognized, to recognize the angle identification.

14. The method according to claim 13, comprising:
- determining the first pose identification that has the position association relationship with the angle identification based on an angle identification candidate area where the angle identification is located.

15. A non-transitory computer-readable storage medium for storing at least one instruction that when executed by a computer, causes the computer to perform an error detection method, comprising:
- determining, in a plurality of error detection cycles, a plurality of pose differences of an end of an operating arm;
- accumulating the plurality of pose differences; and
- generating, in response to an accumulated value of the plurality of pose differences meeting an error detection condition, a control signal related to a fault,
- wherein the method further comprises: in each error detection cycle,
  - obtaining a target pose of the end of the operating arm;
  - acquiring a positioning image;
  - recognizing, in the positioning image, a plurality of pose identifications located on the end of the operating arm;
  - recognizing, based on the plurality of pose identifications, an angle identification located on the end of the operating arm, the angle identification having a position association relationship with a first pose identification of the plurality of pose identifications;
  - determining, based on the angle identification and the plurality of pose identifications, an actual pose of the end of the operating arm; and
  - determining, based on the target pose and the actual pose, a pose difference of the end of the operating arm,
- wherein recognizing the plurality of pose identifications located on the end of the operating arm comprises:
  - determining a plurality of candidate pose identifications from the positioning image;
  - recognizing, based on a pose pattern matching template, an initial pose identification from the plurality of candidate pose identifications;
  - searching for a remaining pose identification in eight searching directions that are associated with the initial pose identification, with an initial pose identification pattern corner of the initial pose identification as a starting point; and
  - stopping searching for the pose identification, in response to the number of the recognized pose identifications being greater than or equal to a pose identification number threshold, or
  - redetermining, in response to the number of the recognized pose identifications being less than the pose identification number threshold and a distance of the searching being greater than twice a distance between previous two pose identification pattern corners of the recognized pose identifications, the initial pose identification from the plurality of candidate pose identifications based on the pose pattern matching template,
- wherein determining the actual pose of the end of the operating arm comprises:
  - determining a roll angle of a pose identification coordinate system relative to an end coordinate system of the operating arm based on the angle identification and the plurality of pose identifications;
  - determining a pose of the pose identification coordinate system relative to a reference coordinate system based on two-dimensional coordinates of the plurality of pose identifications in the positioning image and three-dimensional coordinates of the plurality of pose identifications in the pose identification coordinate system; and
  - determining a pose of the end coordinate system of the operating arm relative to the reference coordinate system as the actual pose based on the roll angle of the pose identification coordinate system relative to the end coordinate system of the operating arm and the pose of the pose identification coordinate system relative to the reference coordinate system, or
- wherein determining the actual pose of the end of the operating arm comprises:
  - determining a roll angle of a pose identification coordinate system relative to an end coordinate system of the operating arm based on the angle identification and the plurality of pose identifications;
  - determining three-dimensional coordinates of the plurality of pose identifications in the end coordinate system of the operating arm based on the roll angle of the pose identification coordinate system relative to the end coordinate system of the operating arm and three-dimensional coordinates of the plurality of pose identifications in the pose identification coordinate system; and determining a pose of the end coordinate system of the operating arm relative to the reference coordinate system as the actual pose based on two-dimensional coordinates of the plurality of pose identifications in the positioning image and three-dimensional coordinates of the plurality of pose identifications in the end coordinate system of the operating arm, wherein the control signal related to the fault comprises a first alarm signal indicating that the control of the operating arm has failed, and the method further comprises:
receiving status information of at least one drive device for driving the operating arm, in response to the target pose and the actual pose meeting an error detection condition; and
sending out a second alarm signal in response to the status information and drive information of the at least one drive device meeting a fault detection condition, the second alarm signal indicating that a drive device of the operating arm has failed.

16. A robot system comprising:
a master manipulator including a robotic arm, a handle disposed on the robotic arm, and at least one master manipulator sensor disposed at one or more joints on the robotic arm, the at least one master manipulator sensor for obtaining joint information of the one or more joints;
an operating arm provided with at least one angle identification and a plurality of pose identifications at its end;
at least one drive device for driving the operating arm;
at least one drive device sensor coupled with the at least one drive device and for obtaining status information of the at least one drive device;
the image acquisition device for acquiring a positioning image of the operating arm; and
a control device configured to be connected with the master manipulator, the at least one drive device, the at least one drive device sensor, and the image acquisition device, and perform an error detection method comprising:
determining, in a plurality of error detection cycles, a plurality of pose differences of the end of the operating arm;
accumulating the plurality of the pose differences; and
generating, in response to an accumulated value of the plurality of pose differences meeting an error detection condition, a control signal related to a fault,
wherein the method further comprises: in each error detection cycle,
obtaining a target pose of the end of the operating arm;
acquiring the positioning image;
recognizing, in the positioning image, the plurality of pose identifications located on the end of the operating arm;
recognizing, based on the plurality of pose identifications, the at least one angle identification located on the end of the operating arm, the at least one angle identification having a position association relationship with a first pose identification of the plurality of pose identifications;
determining, based on the at least one angle identification and the plurality of pose identifications, an actual pose of the end of the operating arm; and
determining, based on the target pose and the actual pose, a pose difference of the end of the operating arm, wherein recognizing the plurality of pose identifications located on the end of the operating arm comprises:
determining a plurality of candidate pose identifications from the positioning image;
recognizing, based on a pose pattern matching template, an initial pose identification from the plurality of candidate pose identifications;
searching for a remaining pose identification in eight searching directions that are associated with the initial pose identification, with an initial pose identification pattern corner of the initial pose identification as a starting point; and
stopping searching for the pose identification, in response to the number of the recognized pose identifications being greater than or equal to a pose identification number threshold, or
redetermining, in response to the number of the recognized pose identifications being less than the pose identification number threshold and a distance of the searching being greater than twice a distance between previous two pose identification pattern corners of the recognized pose identifications, the initial pose identification from the plurality of candidate pose identifications based on the pose pattern matching template, wherein determining the actual pose of the end of the operating arm comprises:
determining a roll angle of a pose identification coordinate system relative to an end coordinate system of the operating arm based on the angle identification and the plurality of pose identifications;
determining a pose of the pose identification coordinate system relative to a reference coordinate system based on two-dimensional coordinates of the plurality of pose identifications in the positioning image and three-dimensional coordinates of the plurality of pose identifications in the pose identification coordinate system; and
determining a pose of the end coordinate system of the operating arm relative to the reference coordinate system as the actual pose based on the roll angle of the pose identification coordinate system relative to the end coordinate system of the operating arm and the pose of the pose identification coordinate system relative to the reference coordinate system, or wherein determining the actual pose of the end of the operating arm comprises:
determining a roll angle of a pose identification coordinate system relative to an end coordinate system of the operating arm based on the angle identification and the plurality of pose identifications;
determining three-dimensional coordinates of the plurality of pose identifications in the end coordinate system of the operating arm based on the roll angle of the pose identification coordinate system relative to the end coordinate system of the operating arm and three-dimensional coordinates of the plurality of pose identifications in the pose identification coordinate system; and
determining a pose of the end coordinate system of the operating arm relative to the reference coordinate system as the actual pose based on two-dimensional coordinates of the plurality of pose identifications in the positioning image and three-dimensional coordinates of the plurality of pose identifications in the end coordinate system of the operating arm, wherein the control signal related to the fault comprises a first alarm signal indicating that the control of the operating arm has failed, and the method further comprises:
- receiving the status information of at least one drive device for driving the operating arm, in response to the target pose and the actual pose meeting an error detection condition; and
- sending out a second alarm signal in response to the status information and drive information of the at least one drive device meeting a fault detection condition, the second alarm signal indicating that a drive device of the operating arm has failed.

* * * * *